US011114132B2

(12) United States Patent
Gomberg et al.

(10) Patent No.: US 11,114,132 B2
(45) Date of Patent: Sep. 7, 2021

(54) MEDIA RECORDING SYSTEM

(71) Applicant: Audigo Labs Inc., San Francisco, CA (US)

(72) Inventors: Brian Chasson Gomberg, San Francisco, CA (US); Armen Alan Nazarian, San Francisco, CA (US); Kenneth Aaron Murphy, Oakland, CA (US)

(73) Assignee: AUDIGO LABS INC., San Francisco, CA (US)

( * ) Notice: Subject to any disclaimer, the term of this patent is extended or adjusted under 35 U.S.C. 154(b) by 0 days.

(21) Appl. No.: 17/125,011

(22) Filed: Dec. 17, 2020

(65) Prior Publication Data
US 2021/0183409 A1    Jun. 17, 2021

Related U.S. Application Data

(60) Provisional application No. 62/949,231, filed on Dec. 17, 2019.

(51) Int. Cl.
*G11B 27/10*     (2006.01)
*H04N 5/765*    (2006.01)
*H04W 56/00*    (2009.01)

(52) U.S. Cl.
CPC .............. *G11B 27/10* (2013.01); *H04N 5/765* (2013.01); *H04W 56/001* (2013.01)

(58) Field of Classification Search
CPC ...... G11B 27/10; H04N 5/765; H04W 56/001
See application file for complete search history.

(56) References Cited

U.S. PATENT DOCUMENTS

| | | | |
|---|---|---|---|
| 10,477,262 B2 * | 11/2019 | Woodman | H04N 21/8547 |
| 2011/0218656 A1 * | 9/2011 | Bishop | H04L 65/4084 |
| | | | 700/94 |
| 2016/0100400 A1 * | 4/2016 | Lu | H04W 4/80 |
| | | | 370/336 |
| 2021/0058179 A1 * | 2/2021 | Bowler | H04J 3/0679 |

* cited by examiner

*Primary Examiner* — Thai Q Tran
*Assistant Examiner* — Jose M Mesa
(74) *Attorney, Agent, or Firm* — Patent Law Works

(57) ABSTRACT

A system and method for synchronizing clocks including synchronizing a first clock to a second clock, the first clock associated with a first device, the first device associated with a first device type, the second clock associated with a second device, the second device associated with a second device type; subsequent to synchronizing the first clock to the second clock, synchronizing a third clock to the first clock, where the third clock is associated with a third device, the third device associated with the first device type; synchronizing the second clock to a fourth clock, the fourth clock associated with a fourth device, the fourth device associated with a third device type; subsequent to synchronizing the second clock to the fourth clock, resynchronizing the first clock to the second clock; and subsequent to resynchronizing the first clock to the second clock, resynchronizing the third clock to the first clock.

20 Claims, 18 Drawing Sheets

MEDIA RECORDING SYSTEM

CROSS-REFERENCE TO RELATED APPLICATIONS

The present application claims priority, under 35 U.S.C. § 119, of U.S. Provisional Patent Application No. 62/49,231, filed Dec. 17, 2019, and entitled "Portable Audio Recording System," the entirety of which is hereby incorporated by reference.

BACKGROUND

Professional quality audio recording is inaccessible to entry level creators (musicians, podcasters, video content creators, journalists, film makers, etc.) from a technical, cost, and ease-of-use perspective. Additionally, conventional solutions for high quality recording typically require numerous pieces of, sometimes bulky, equipment, significant technical know-how and the need for a computer at some point in the recording, editing or sharing process.

Audio recordings captured on mobile phones, cameras, laptops, action cameras or other multipurpose devices suffer from poor audio quality due to suboptimal microphone placement, limited number of recording inputs, microphone quality, physical constraints due to microphone size, placement and mechanical enclosure, low quality internal signal routing and processing, loss or corruption of data due to a long analog signal chain (from microphone to cable to interface to cable to computer) and/or unreliable wireless interface (Bluetooth or other live radio transmission).

Another common problem in the video content creation space is that creators often have setups where the audio and video inputs are physically linked together on the same device or rig. Therefore, they must choose between placing the device or rig in the optimal location for video or to optimize for audio. Almost always creators optimize placement for video, and settle for the audio quality associated with that placement. A common example of this is someone filming video content on their mobile phone, and simply using the audio captured from the phone's onboard microphone from a location optimized to frame the shot properly.

Yet another common problem is an improperly set gain. When gain is set too high, clipping may occur, resulting in perceptible distortion. When gain is set too low, the dynamic range of the system is not be fully utilized, which may result in the noise floor of the microphone distorting the audio, and limiting of the effective digital resolution, leading to a worse quality quantization of the analog audio data.

SUMMARY

In general, an innovative aspect of the subject matter described in this disclosure may be embodied in methods that include synchronizing a first clock to a second clock, the first clock associated with a first device, the first device associated with a first device type, the second clock associated with a second device, the second device associated with a second device type; subsequent to synchronizing the first clock to the second clock, synchronizing a third clock to the first clock, where the third clock is associated with a third device, the third device associated with the first device type; synchronizing the second clock to a fourth clock, the fourth clock associated with a fourth device, the fourth device associated with a third device type; subsequent to synchronizing the second clock to the fourth clock, resynchronizing the first clock to the second clock; and subsequent to resynchronizing the first clock to the second clock, resynchronizing the third clock to the first clock.

According to yet other innovative aspects of the subject matter described in this disclosure, one or more systems comprising a processor; and a memory storing instructions that, when executed, cause the system to perform one of the methods described above.

Other implementations of one or more of these aspects include corresponding systems, apparatus, and computer programs, configured to perform the actions of the methods, encoded on computer storage devices. These and other implementations may each optionally include one or more of the following features.

The features may include: prior to synchronizing the first clock to the second clock, synchronizing the first clock and the third clock to a common, high-accuracy clock. The common, high accuracy clock is a Wi-Fi TSF clock. The first device is a primary recording device, the second device is a client device, the third device is a non-primary recording device, and the fourth device is a server. The client device is a mobile phone. Synchronizing one clock to another clock may include: requesting a first clock value, $C_1$, from the another clock; obtaining a first local clock value, $C_{2t1}$, local to the one clock at a time, $t_1$, of the request; receiving the first clock value, C1, from the another clock; obtaining a second local clock value, $C_{2t2}$, at a time, $t_2$, of receipt of the first clock value, $C_1$. The features may include: determining, whether media is being recorded; and responsive to determining that media is being recorded, smoothing the synchronizations and the resynchronizations over a period of time to avoid a discontinuity. The first device, the second device, and the third device are associated with a first user, and a fifth device, a sixth device, and a seventh device are associated with a second user at a location remote from the first user, the features may include: synchronizing a fifth clock to a sixth clock, the fifth clock associated with the fifth device, the fifth device associated with the first device type, the sixth clock associated with a sixth device, the sixth device associated with the second device type; subsequent to synchronizing the fifth clock to the sixth clock, synchronizing a seventh clock to the fifth clock, where the seventh clock is associated with a seventh device, the seventh device associated with the first device type; synchronizing the sixth clock to the fourth clock, the fourth clock associated with the fourth device, the fourth device associated with the third device type; subsequent to synchronizing the sixth clock to the fourth clock, resynchronizing the fifth clock to the sixth clock; and subsequent to resynchronizing the fifth clock to the sixth clock, resynchronizing the seventh clock to the fifth clock. The first user and the second user remotely collaborate on a recording, the first device, the second device, the third device, the fifth device, the sixth device, and the seventh device synchronized to the fourth device.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The techniques introduced herein overcome the deficiencies and limitations of the prior art at least in part by providing systems and methods for (1) synchronizing media recorded by multiple devices, and (2) auto-leveling audio. It should be understood that the language used in the present disclosure has been principally selected for readability and instructional purposes, and not to limit the scope of the subject matter disclosed herein.

The present disclosure relates to media recording. Some aspects of the disclosure relate to synchronizing audio that is recorded across multiple devices. For example, video and/or audio recorded by a user's smartphone and audio from a separate audio recording device may be synchronized. In another example, a first user's recording device and a second user's recording device, where the two users are collaborating remotely are synchronized. While other aspects of the disclosure relate to auto-leveling for audio recording, for example, automatically setting and dynamically modifying gain to prevent clipping.

In the following descriptions, for purpose of explanation, numerous specific details are set forth in order to provide a thorough understanding of the present disclosure. However, it should be noted that the present disclosure might be practiced without these specific details.

Example System Embodiments

Figure 1:
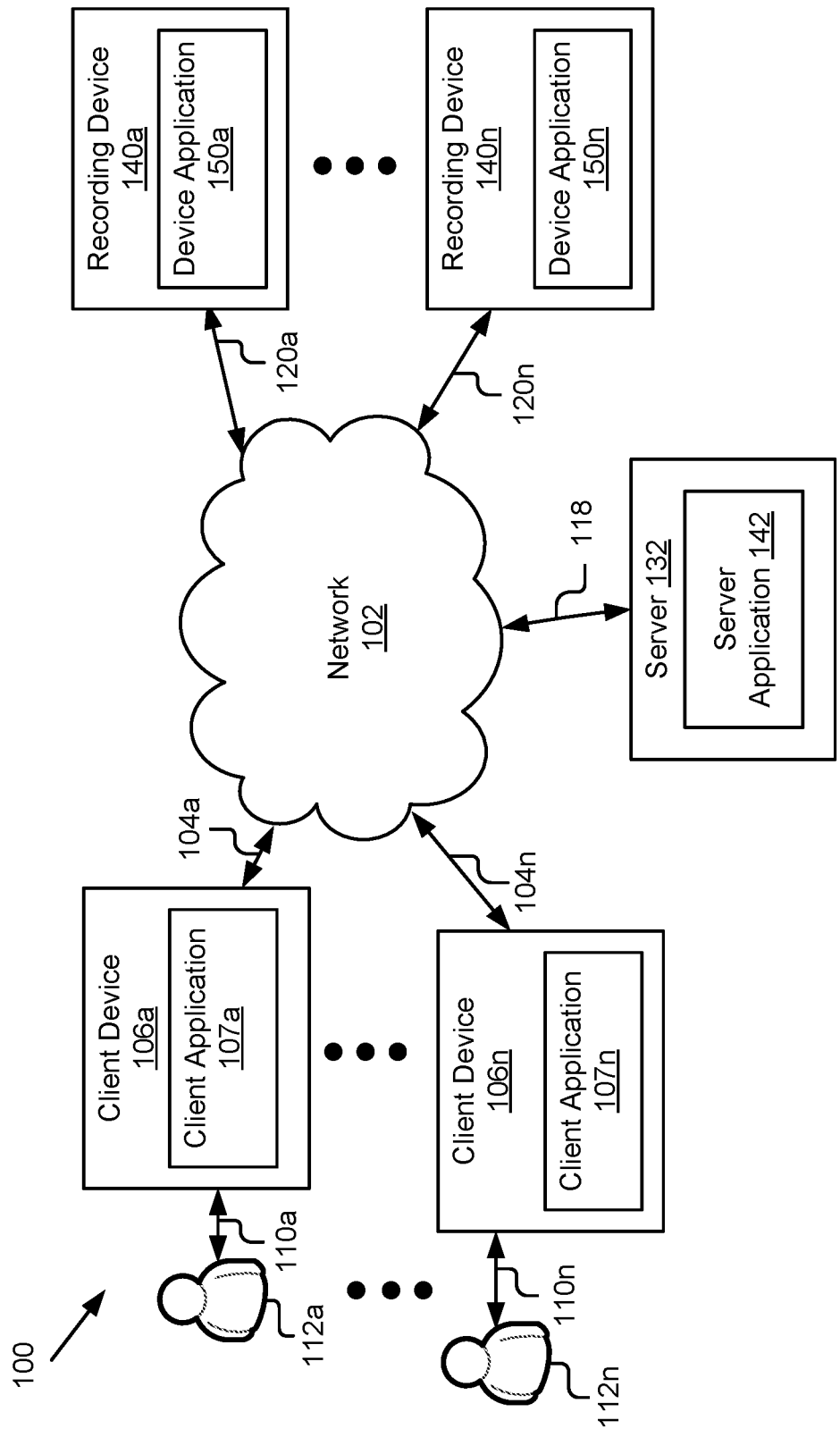
FIG. 1 presents a block diagram of an example system for media recording, according to certain embodiments of the present disclosure.

FIG. 1 is a block diagram illustrating an example system 100 for media recording according to one embodiment. The illustrated system 100 includes client devices 106a . . . 106n, server 132, and recording devices 140a . . . 140n, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as 112) as illustrated by lines 110a . . . 110n. The recording devices 140a . . . 140n (also referred to individually and collectively as 140) may be respectively coupled to the network 102 via signal lines 120a . . . 120n. The server 132 may be coupled to the network 102 via signal line 118. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, Bluetooth® Low Energy communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the Hypertext Markup Language (HTML), the Extensible Markup language (XML), JavaScript Object Notation (JSON), YAML Ain't Markup Language (YAML), Electronic Data Interchange (EDI) including those in the EDI-FACT and X12 families, ACORD/AL3, various National Council for Prescription Drug Programs (NCPDP) standards, Comma Separated Values (CSV), protocol buffers, etc. In addition, all or some data can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having any number of client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, microphone, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, single-board computers (e.g. Raspberry PI), etc. While two or more client devices 106 are depicted in FIG. 1, the system 100 may include any number of client devices 106. In addition, the client devices 106a . . . 106n may be the same or different types of computing devices. In the depicted implementation, the client devices 106a . . . 106n respectively contain instances 107a . . . 107n of a client application (also referred to individually and collectively as client application 107). The client application 107 may be storable in a memory and executable by a processor of a client device 106.

While the illustrated system 100 is depicted as including a single server 132, the description herein applies to a system including any number of servers. In some embodiments, the server 132 is part of an Internet cloud environment. Examples of Internet cloud environments include, but are not limited to, Amazon Web Services, Microsoft Azure, and Oracle Cloud. The server 132 is a computing device having data processing and communication capabilities. In some embodiments, a server 132 may include a processor (e.g., virtual, physical, etc.), a memory, a power source, a network interface, and may include other components whether software or hardware, such as a display, graphics processor, wireless transceivers, keyboard, camera, microphone, sensors, firmware, operating systems, drivers, various physical connection interfaces (e.g., USB, HDMI, etc.). The server 132 may couple to and communicate with other entities of the system 100 via the network 102 using a wireless and/or wired connection.

Examples of a server 132 may include, but are not limited to, one or more hardware servers, server arrays, storage devices, systems, etc., and/or may be centralized or distributed/cloud-based. In some implementations, the server 132 may include one or more virtual servers, which operate in a host server environment and access the physical hardware of the host server including, for example, a processor, memory, storage, network interfaces, etc., via an abstraction layer (e.g., a virtual machine manager). While one server 132 is depicted in FIG. 1, the system 100 may include one or more servers 132. In addition, a plurality of servers may be of the same or different types of computing devices. In the depicted implementation, the server 132 contains a server application 142. The server application 142 may be storable in a memory and executable by a processor of the server 132.

A recording device 140 is a computing device having data processing and communication capabilities. While FIG. 1 illustrates two recording devices 140, the present specification applies to any system architecture having any number of client devices 106. In some embodiments, a recording device 140 may include a processor (e.g., virtual, physical, etc.), a memory, a power source, a network interface, and may include other components whether software or hardware, such as a display, graphics processor, wireless transceivers, keyboard, microphone(s), sensors, firmware, operating systems, drivers, various physical connection interfaces (e.g., USB, HDMI, etc.). The recording device 140 may couple to and communicate with other entities of the system 100 via the network 102 using a wireless and/or wired connection.

An example of a recording device 140 is described in the U.S. Provisional Application 62/949,231, which is incorporated by reference herein. In one embodiment, a recording device 140 may include, but is not limited to, an Audigo portable recording device produced by Audigo Labs. In some implementations, the recording device 140 may include, for example, a processor, memory, storage, network interfaces, etc. While two recording devices 140 are depicted in FIG. 1, the system 100 may include any number of recording devices 140. In addition, a plurality of recording devices 140 may be of the same or different types of computing devices. In the depicted implementation, the recording devices 140a . . . 140n respectively contain instances 150a . . . 150n of a device application (also referred to individually and collectively as device application 150). The device application 150 may be storable in a memory and executable by a processor of the recording device 140.

It should be understood that the system 100 illustrated in FIG. 1 is representative of an example system according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into a single computing device or system or additional computing devices or systems, etc.

The system 100 provides a number of features and functionalities, which a user may select and implement. In one embodiment, the system 100 enables a user 112 to create a single or multi-device live audio stream. For example, the client device 106 is a user's mobile phone, and the user, via the client application 107 (e.g. a mobile app.) selects an option to generate a live stream that uses the mobile phone's camera for video and one or more recording devices 140 to capture audio. In one such embodiment, a recording device 140, via the device application 150, acts as a mixing hub, maintains synchronization among the various devices 106/140, and provides a single file stream to the mobile application, the mobile phone then handles synchronization of the audio stream to the video before sending to a live streaming service. Accordingly, the signal processing load, data bandwidth, and computational requirements are beneficially distributed among the various devices.

In one embodiment, the system 100 allows multiple users 112 in multiple, remote locations to start and collaborate in a recording (e.g. to produce a podcast). In one such embodiment, the various users' devices maintain synchronization over the Internet (e.g. via network 102 and server 132). Once the recording is complete, the data from the various devices, which are synchronized, are uploaded, e.g., from the client devices 106 and/or recording devices 140 to the server 132, where the media recordings are assembled by the server application 142 into a composite recording.

It should be noted that the foregoing examples include synchronization of media captured across multiple devices 106/140. Accordingly, various examples of synchronization are described below with reference to FIG. 4.

Figure 2:
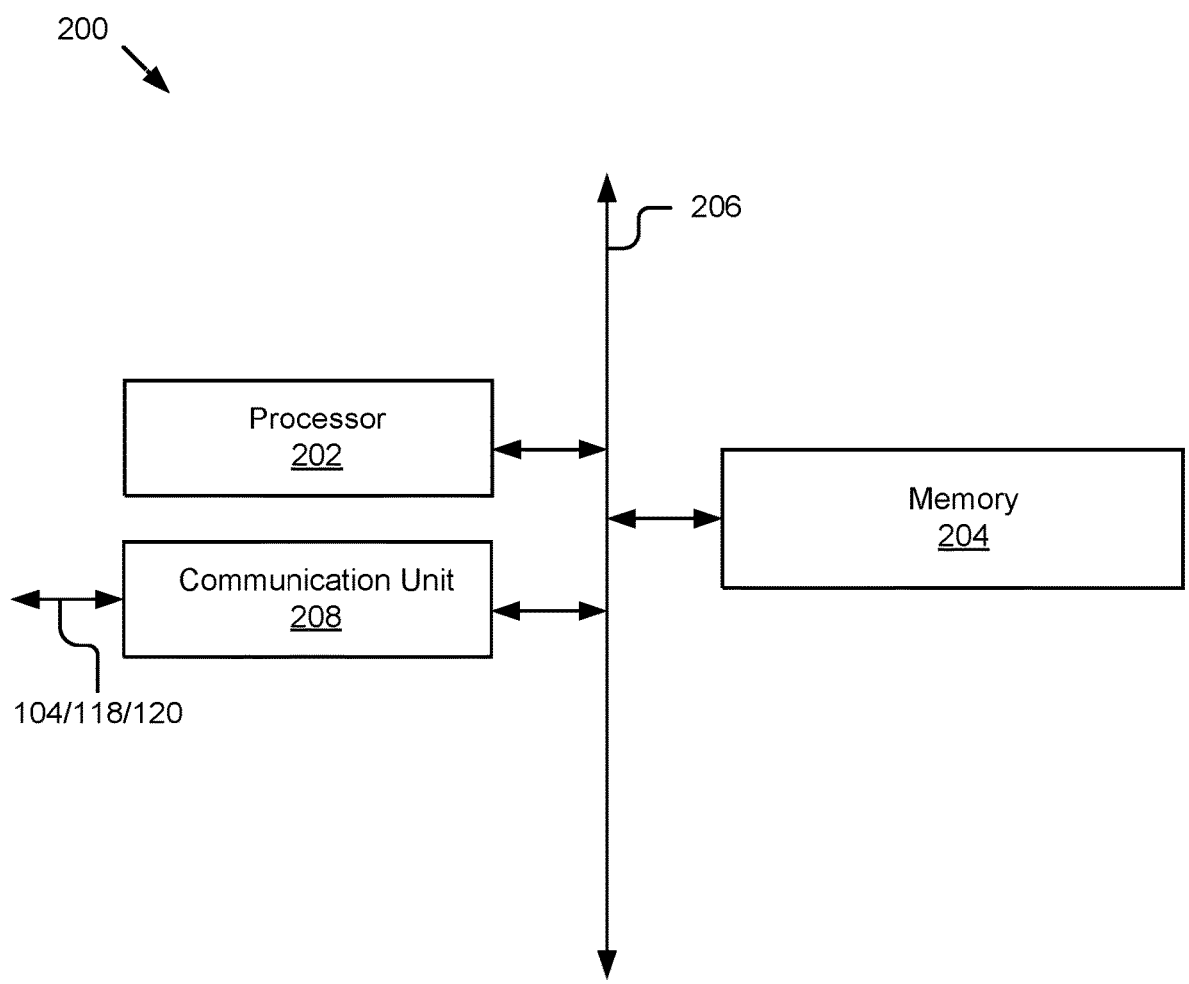
FIG. 2 presents a block diagram of an example device, according to certain embodiments of the present disclosure.

Referring now to FIG. 2, FIG. 2 illustrates an example computing device 200 according to one embodiment. In one embodiment, a computing device 200, such as a client device 106, recording device 140, or server 132, may include a processor 202, a memory 204, and a communication unit 208, which may be communicatively coupled by a bus 206. However, it should be understood that a computing device 200 may take other forms and include additional or fewer components without departing from the scope of the present disclosure. For example, a computing device 200 may include input and output devices (e.g., a display, a keyboard, a mouse, touch screen, speakers, etc.), various operating systems, sensors and other physical configurations.

The processor 202 may execute code, routines and software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or a plurality of processing units and/or cores. In some implementations, the processor 202 may be capable of generating and providing electronic display signals to a display device (not shown), supporting the display of images, capturing and transmitting images, capturing and transmitting audio, performing complex tasks including various types of feature extraction and sampling, etc. In some implementations, the processor 202 may be coupled to the memory of the computing device 200 via the bus 206 to access data and instructions therefrom and store data therein. The bus 206 may couple the processor 202 to the other components of the computing device 200 including, for example, the memory 204 and communication unit 208.

The memory 204 may store and provide access to data to the other components of the computing device 200. In some implementations, the memory 204 may store instructions and/or data that may be executed by the processor 202. For example, the computing device 200 may be a server 132 and the memory 204 may store a server application 142 (not shown). As another example, the computing device 200 may be a client device 106 and the memory 204 may store the client application 107 (not shown). As yet another example, the computing device 200 may be a recording device 140 and the memory 204 may store the device application 150 (not shown). The memory 204 is also capable of storing other instructions and data, including, for example, an operating system, hardware drivers, other software applications, databases, media (e.g. audio and/or video), which may also occasionally be referred to herein as a "recording" or similar, etc. The memory 204 may be coupled to the bus 206 for communication with the processor 202 and the other components of the computing device 200.

In one embodiment, the memory 204 of the computing device 200 stores the code and routines that, when executed by the computing device's processor 202, perform the functions as described herein. For example, the functionality described below with reference to the application 106/142/150, or the sub-components thereof, may be performed when code and routines associated with the applications 106/142/150 and stored in memory 204 are executed by the processor 202. For example, the synchronization functionality described below with reference to a recording device 140 may be performed when code and routines associated with a recording device instance of the synchronization engine 302 are stored in memory 204 are executed by the processor 202 of a recording device 140. Similarly, the synchronization functionality described below with reference to a client device 106 (e.g. a mobile phone) may be performed when code and routines associated with a client device instance of the synchronization engine 302 are stored in memory 204 are executed by the processor 202 of the client device 106.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory may include, but is not limited to, one or more of a dynamic random-access memory (DRAM) device, a static random-access memory (SRAM) device, a discrete memory device (e.g., a PROM, FPROM, ROM), a hard disk drive, an optical disk drive (CD, DVD, Blue-Ray™, etc.), SD card, MicroSD card. It should be understood that the memory may be a single device or may include multiple types of devices and configurations.

The bus 206 can include a communication bus for transferring data between components of a computing device 200 or between computing devices, a network bus system including the network 102 or portions thereof, a processor mesh, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor to the network 102, which may in turn be coupled to other processing systems. The communication unit 208 can provide other connections to the network 102 and to other entities of the system 100 using various standard network communication protocols, including, for example, those discussed elsewhere herein.

As mentioned above, a computing device 200 may include other and/or fewer components. Examples of other components may include a display, an input device, a sensor, etc. (not shown). In one embodiment, the computing device 200 includes a display. The display may display electronic images and data output by the computing device 200 for presentation to a user. The display may include any display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the computing device 200. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Figure 3:
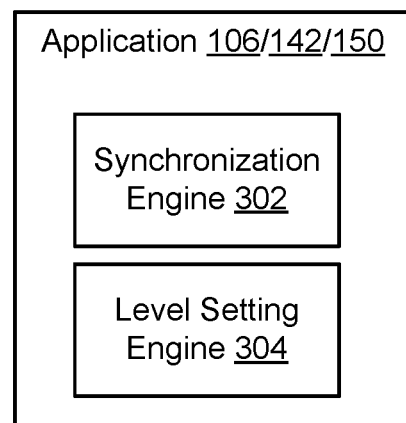
FIG. 3 presents a block diagram of an example application, according to certain embodiments of the present disclosure.

FIG. 3 presents a block diagram of an example application, according to certain embodiments of the present disclosure. In the illustrated embodiment, application 106/142/150 includes a synchronization engine 302, which is described below with reference to FIG. 4, and a level engine 304, which is described below with reference to FIG. 7.

As previously discussed, the system 100, in some embodiments, provides functionality including live streaming, remote collaboration, and multi-device media recording, which benefit from synchronization among the multiple devices 106/132/140 potentially involved in recording the media. It should be recognized from the description below that some of the features and functionalities may be distributed across different devices 106/132/140 and/or that a synchronization engine 302 or level engine 304 may operate differently depending on what device, or type of device 106/132/140, it executes. For example, as is described below, the role a recording device 140 plays in synchronization may differ from that of a client device 106 based on, for example, a use case/scenario.

Figure 4:
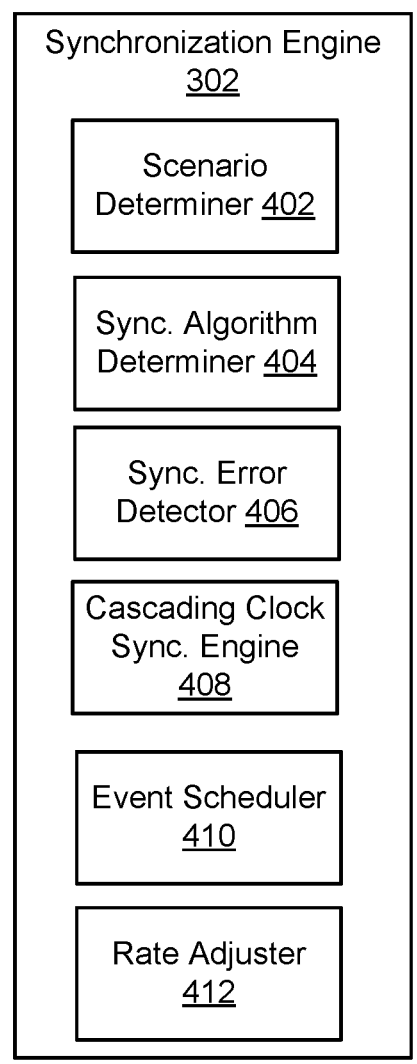
FIG. 4 presents a block diagram of an example synchronization engine, according to certain embodiments of the present disclosure.

Referring now to FIG. 4, a block diagram illustrating an example synchronization engine 302 is described in more detail according to one embodiment. In one embodiment, the synchronization engine 302 includes a scenario determiner 402, a synchronization algorithm determiner 404, a synchronization error detector 406, a cascading clock synchronization engine 408, an event scheduler 410, and rate adjuster 412.

The components 402-412, or a subset thereof, can be software or routines for providing the features and functionalities described herein. In one embodiment, the components 402-412, or a subset thereof, are a set of instructions executable by the processor 202. In one embodiment, the components 402-412, or a subset thereof, are stored in the memory 204 and are accessible and executable by the processor 202. In one embodiment, the components 402-412, or a subset thereof, are adapted for cooperation and communication with the processor 202 and other components of the computing device 200 or other components of the system 100.

The independent clocks within the system 100 often "tick" at different rates. Common reasons for this include manufacturing tolerances and temperature variation. Because it is rare that the actual physical characteristics of a clock are adjustable, the synchronization engine 302 synchronizes two or more clocks.

The scenario determiner 402 determines the clock(s) to be synchronized and the source-of-truth clock to which the clock(s) are to be synchronized based on a recording scenario, which may also occasionally be referred to a "use case" or similar. For example, when the clock synchronization process may be used for cases where the recording device 140 and client app. 107 (e.g. a mobile app) are to be in sync. In these use cases, according to one embodiment, the client device's clock is used as the source of truth, and the recording device's clock is synchronized to it. The recording device 140 performs the clock synchronization process described below by requesting the time from the client device 106 over the Wi-Fi and/or BLE link, according to one embodiment.

In another example, the clock synchronization process may be used for cases where the client device 106 and server 132 are to be in sync. In these cases, the server's clock is used as the source of truth, and the client device's clock is synchronized to it. The client device 106 performs the clock synchronization process described below by requesting the time from the server 132 via the mobile phone's internet connection.

In yet another example, in cases where there are multiple recording devices 140 acting together in a local network, one of the recording devices 140 may be designated as the primary recording device 140. This primary recording device 140 becomes the source-of-truth and the other recording devices 140 in the network synchronize their clocks to it. In one embodiment, this is done by leveraging the Wi-Fi TSF clock. This clock is synchronized with all devices on a given Wi-Fi network as described in the 802.11 specification.

In some embodiment, the TSF clock is used rather than sending requests over Wi-Fi because the TSF clock is synchronized to an extremely high level of precision across all devices within the Wi-Fi network, and the latency for each device to synchronize its own clock to the TSF clock is relatively low. These two things may combine to achieve synchronization between clocks on separate recording devices within tens of microseconds.

The synchronization algorithm determiner 404 converts from one clock's value to another clock's value, and vice versa. For clarity and convenience, the synchronization algorithm engine's 404 features and functionality are discussed with reference to non-limiting examples. Assume that, based on the use case determined by the scenario determiner 402, there are two clocks to synchronize: C1 which is the source-of-truth clock, which exists on some remote device (i.e. remote to the instance of the synchronization engine 302), and C2 which is the local device's clock. In some embodiments, the $C_2$ is internal to a device and is not used outside the synchronization algorithm determiner 404, nor is its value broadcast to other devices. In one embodiment, the synchronization algorithm determiner 404 defines the value of clock C1 relative to C2 with Formula 1:

$$C_1 = \alpha * C_2 + \beta$$

In Formula 1, $\alpha$ represents a ratio between the rate of $C_2$ and the rate of $C_1$. For example, assuming $C_1$ is running at 1.5 Hz and $C_2$ is running at 1.25 Hz, then a is 1.2 (i.e. 1.5 divided by 1.25). Because $C_1$ and $C_2$ may have started at different times, the synchronization algorithm determiner 404 uses $\beta$ to define the offset between $C_1$ and $C_2$. The synchronization algorithm determiner 404 determines these values, and with these two values, $\alpha$ and $\beta$, the synchronization algorithm determiner 404 may calculate the value of $C_1$ for the same moment in time, when given $C_2$. To summarize and simplify, the synchronization algorithm determiner 404 synchronizes clocks, so for the device with clock $C_2$, time can be measured with respect to clock $C_1$, as though the device had direct access to clock $C_1$.

In order to determine the value of $\alpha$ and $\beta$, the synchronization algorithm determiner 404 in an ideal scenario compares the value of $C_1$ to the value of $C_2$ at the same moment in time. However, in practice, the values of $C_1$ and $C_2$ cannot be taken directly at the same moment in time. More specifically, while the synchronization algorithm determiner 404 may capture the value of $C_2$ nearly instantaneously, as it is local, it takes a non-zero (unknown and potentially variable) amount of time to read the "current" value of $C_1$. To compensate for this, the synchronization algorithm determiner 404 captures a first value of $C_2$, denoted as $C_{2t1}$, immediately before issuing the read request, which is denoted herein as occurring at $t_1$, and immediately after receiving the response, captures a second $C_2$ value, denoted $C_{2t2}$, which is denoted herein as occurring at $t_2$. The synchronization algorithm determiner 404, therefore, knows that the value of $C_1$ which was read and returned is synchronized to a time between $t_1$ and $t_2$ and associated with a $C_2$ value between that of $C_{2t1}$ and $C_{2t2}$.

In one embodiment, the synchronization algorithm determiner 404 assumes that the read latency is symmetric, so that the value of $C_1$ is determined to be captured halfway between $t_1$ and $t_2$. Therefore, the $C_2$ value used in Formula 1 is the value of the local clock halfway between $t_1$ and $t_2$.

In one embodiment, the synchronization algorithm determiner 404 repeatedly requests the value of $C_1$ and captures $C_1$, $C_{2t1}$ and $C_{2t2}$ associated with each request. For example, the synchronization algorithm determiner 404 sends a first burst of requests for the value of $C_1$ (e.g. ten times within milliseconds) and issues a second burst of requests (another ten request) some period (e.g. seconds) later. In one embodiment, the synchronization algorithm determiner 404 calculates the round-trip latency ($C_{2t2}$–$C_{2t1}$) and captures multiple consecutive sets of data points. For example, the synchronization algorithm determiner 404 captures multiple points as $\{C_{2t2}–C_{2t1}, C_1, C_2\}$ where $C_2$ is the determined value of the local clock at the time it was determined that $C_1$ was read (i.e. the value of $C_2$ value halfway between $t_1$ and $t_2$). In one embodiment, the synchronization algorithm determiner 404 finds the data point with the smallest round-trip latency from each burst of requests, then stores the pair of $C_1$ and $C_2$ values.

In some embodiment, e.g., where greater accuracy is desired, other methods of determining the best pair of $C_1$ and $C_2$ values across the set of data points can be employed. In one embodiment, the synchronization algorithm determiner 404 assumes that the ratio between the rates of the clocks is insignificant relative to the time it takes to execute the requests and calculations. In other words, the error accumulated between consecutive read requests due to the clocks not running at exactly the same rate is of a smaller order of magnitude than the accuracy with which the offset value is calculated.

In order to calculate the value of $\alpha$, the synchronization algorithm determiner 404 uses multiple pairs of $C_1$ and $C_2$ values. Therefore, the synchronization algorithm determiner repeats the above process over a period of time. For example, obtaining a pair of $C_1$ and $C_2$ values from a first burst of requests and a second pair from a second burst of requests. The synchronization algorithm determiner 404 then analyzes how these pairs of $C_1$ and $C_2$ values change over time. The synchronization algorithm determiner 404 determines the rate at which the pair of $C_1$ and $C_2$ values change, which is the $\alpha$ value.

For example, assume that the lowest latency request from a first burst of requests and a lowest latency request from a second burst of requests are eight (8) seconds apart with respect to $C_2$ and assume that the difference between the instantaneous offset values for those two points is 7 seconds, the value of $\alpha$ is 7/8=0.875. The synchronization algorithm determiner 404 can then plug in the $C_1$ and $C_2$ values from the most recent set of values along with this value of $\alpha$ to calculate the value of $\beta$.

Figure 5:
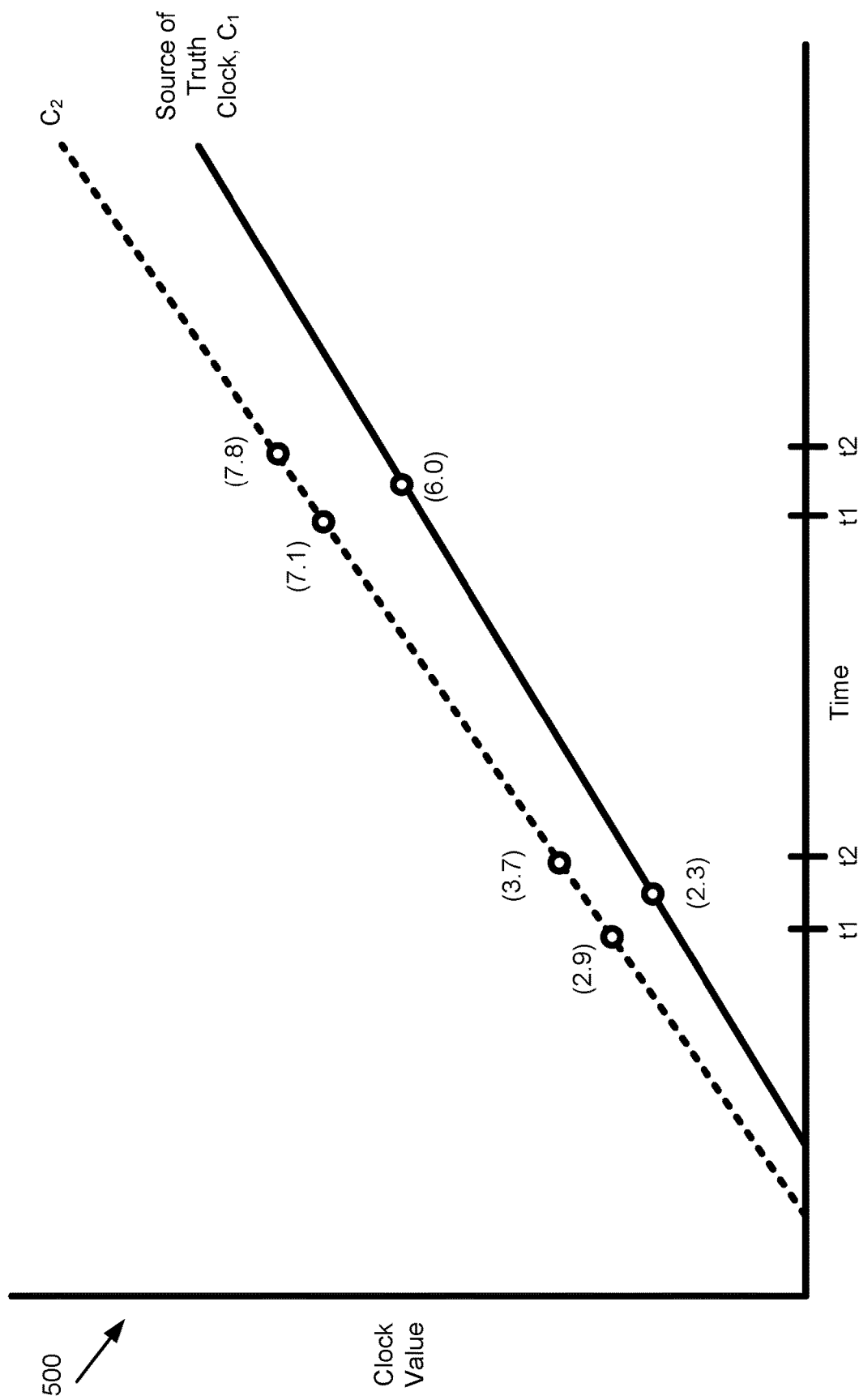
FIG. 5 presents a graph representing example clocks for determining a clock synchronization algorithm, according to certain embodiments of the present disclosure.

Referring now to FIG. 5, an example implementation of the synchronization algorithm determiner 404 is described graphically. In graph 500, the X-axis is "real-world" or "wall-clock" time (not a time referenced by either device) and the dotted and solid lines are the device's internal clock, $C_2$, and the source-of-truth clock, $C_1$, to which the device is synchronizing, respectively. To rephrase, the synchronization algorithm determiner 404 generates Formula 1 and derives the values of $\alpha$ and $\beta$, which the synchronization algorithm determiner 404 applies to the dashed, $C_2$, line, which results in a line that lines up closely with the solid line of $C_1$.

In FIG. 5, each set of three (3) points on the graph represent an instance of the above-described synchronization process. In practice, there may be more sets of points around the two shown in FIG. 5, but the graph is simplified to just show the two requests with the smallest round-trip latency for clarity and convenience. Note that the label on each point is the value of the device's clock (the Y-axis value) at that point in time. Each point is explained in detail below, from left to right:

[2.9 on the dotted line]—The synchronization algorithm determiner 404 requests a time from the source-of-truth clock and obtains the time with respect to the local clock ($t_1$), which is 2.9, i.e., a first instance $C_{2t1}$.

[2.3 on the solid line]—The source of truth clock reads and sends its time, in the response to the request sent at $t_1$, which is 2.3, i.e., a first instance $C_1$.

[3.7 on the dotted line]—The synchronization algorithm determiner 404 receives a response from the point-of-truth clock, and obtains the time at which the response was received with respect to the local clock ($t_2$), which is 3.7, i.e., a first instance $C_{2t2}$.

[7.1 on the dotted line]—Again, the synchronization algorithm determiner 404 requests a time from the source-of-truth clock and obtains the time with respect to the local clock (new $t_1$), which is 7.1, i.e., a second instance $C_{2t1}$.

[6.0 on the solid line]—The source of truth clock reads and sends its time, in response to the request sent at new $t_1$, which is 6.0, i.e., a second instance $C_1$

[7.8 on the dotted line]—The synchronization algorithm determiner 404 receives a response from the point-of-truth clock, and obtains the time at which the response was received with respect to the local clock (new $t_2$), which is 7.8, i.e., a second instance $C_{2t2}$.

In one embodiment, the synchronization algorithm determiner 404 stores these points as the following sets of $\{t_2-t_1, C_1, C_2\}$: $\{0.8, 2.3, 3.3\}$ for the first instance and $\{0.7, 6.0, 7.45\}$ for the second instance. As the synchronization algorithm determiner 404 captured these two sets 7.45–3.3=4.15 seconds apart, where 7.45 is the midpoint, or average, of 7.8 and 7.1, and 3.3 is the midpoint, or average, of 3.7 and 2.9. The synchronization algorithm determiner 404 determines that the $C_1$ value changed by 6.0–2.3=3.7 during that 4.15 second period. The synchronization algorithm determiner 404 then determines that the value of $\alpha$ is 3.7/4.15=0.89. Using the determined value of $\alpha$ and $C_1$ and $C_2$ values from one of the sets of points, the value of $\beta$ may be determined algebraically, for example, 6.0–0.89*7.45=–0.63. The determined $\alpha$ and $\beta$ may confirmed by plugging in either or both of the two (2) $C_2$ values from above (i.e. 3.3 and/or 7.45)

into our equation ($C_1=0.89*C_2-0.63$) and verifying the results match the corresponding $C_1$ value.

Referring again to FIG. 4, in order to maintain the clock synchronization over time, the synchronization error detector 406 detects when the current $\alpha$ and $\beta$ values are no longer accurate and adjusts those values in a manner that results in a synchronized state without causing any discontinuities or significant step-changes to the speed of the clock.

In one embodiment, the synchronization error detector 406 repeatedly calculates the $\alpha$ and $\beta$ values, in the same manner as the synchronization algorithm determiner 404, but does not update the values used by the formula in real-time. Instead, whenever the synchronization error detector 406 calculates a new set of $\alpha$ and $\beta$ values, the synchronization error detector 406 calculates $C_1$ with these new values as well as with the currently in-use $\alpha$ and $\beta$ values. When the synchronization error detector 406 determines that the error (e.g. a difference or percent difference) in the $C_1$ values satisfies a threshold, the synchronization error detector 406 takes action to remedy the error. The exact threshold may vary based on a number of criteria, and may be chosen based on things such as: the desired accuracy of the clock synchronization, the latency in performing the synchronization, the jitter in the synchronization, and other application-specific properties.

When the synchronization error detector 406 determines that the error satisfies the threshold, the $\alpha$ and $\beta$ values are gradually adjusted over time to avoid any step-changes in the value or speed of the synchronized clock. In one embodiment, this is done through a closed-loop controller which is tuned for making small adjustments to the $\alpha$ and $\beta$ values. In one embodiment, the control loop ensures that system can react to changes to the speed of the source-of-truth clock and eventually settle on an accurate synchronization of the clock.

As described above, for cases where there are multiple recording devices 140 acting together in a local network, the Wi-Fi TSF clock may be used as the source-of-truth among those recording devices 140 according to some embodiments. In some implementations, the synchronization engine 302 does not simply synchronize all the devices to the common TSF clock because this clock is not controllable by the synchronization engine 302, and, for the cascading clock synchronization (described below) to work, the primary clock within the recording device 140 network need to be controlled to ensure synchronization to the higher-level clock (i.e. from the client device 106).

The cascading clock synchronization engine 408 coordinates a cascading clock synchronization. In one embodiment, clocks of the various devices 106, 132 and 140 may be associated with a hierarchical level for example based on device type. In some embodiments, the cascading clock synchronization engine ensures that the clock of its associated device is synchronized to a higher-level clock (i.e. a clock in a device that is higher in the hierarchy). In one embodiment the hierarchy may be based on device type. For example, the hierarchy from high-to-low may include: server 132, client device 106, primary recording device 140, secondary recording device 140. In use cases where there are multiple recording devices 140 as well as the client device 106 and, perhaps, even a server 132, the cascading clock sync engine 408 may coordinate synchronization across devices at multiple levels of a hierarchy.

Figure 6:
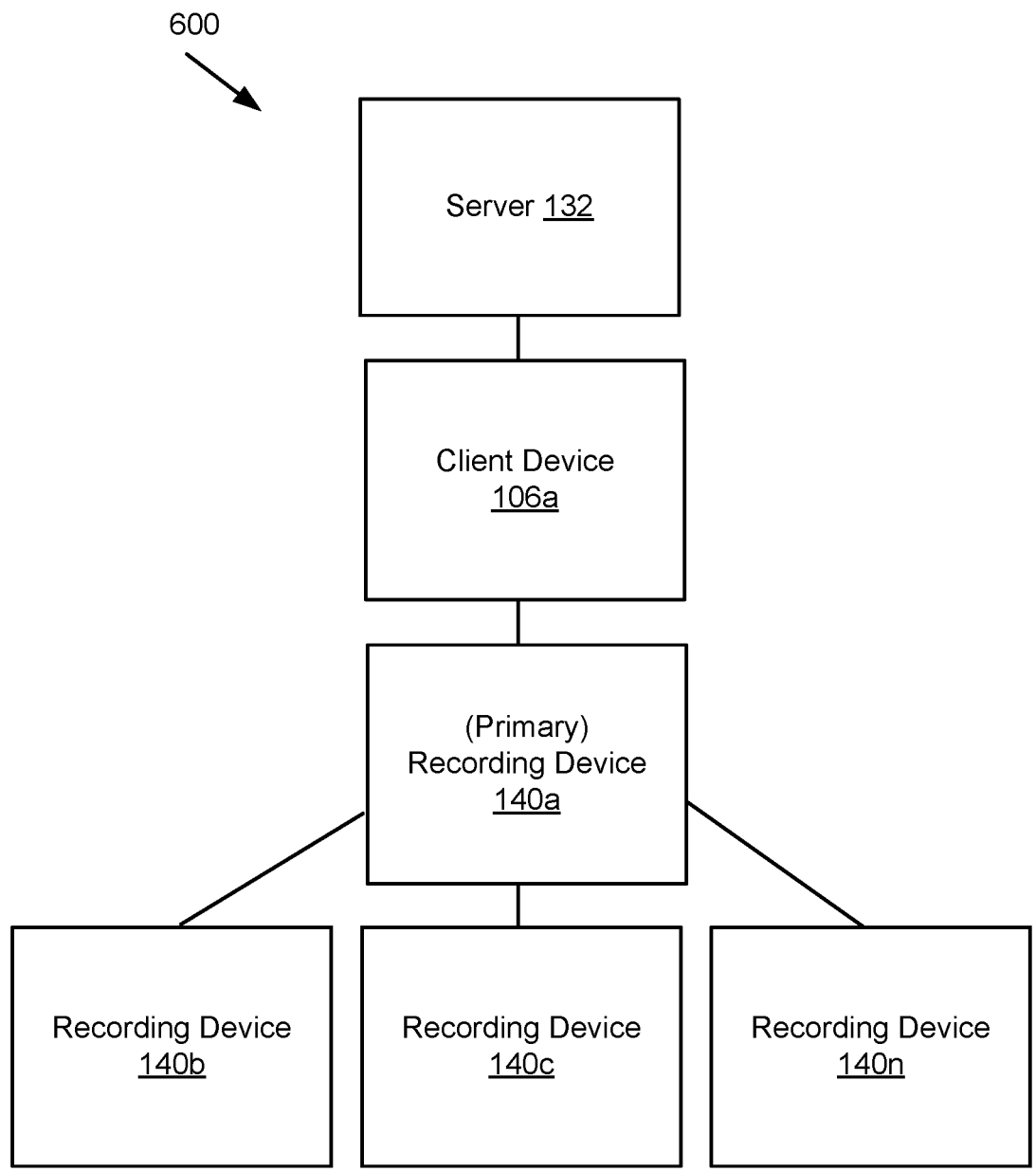
FIG. 6 presents a block diagram of an example tree associated with cascading synchronization, according to certain embodiments of the present disclosure.

Conceptually, in the case of multiple levels of clock synchronization, the synchronization relationships can be represented as a tree, as illustrated in FIG. 6, with the ultimate source of truth being the root of the tree. In a more complex case of multiple recording devices 140, the client device 106, and the server 132, the server 132 sits at the root of the tree for clock synchronization, with the client device 106 synchronizing its clock to it, and the recording devices 140 syncing their clocks to the client device 106, as illustrated by the tree of FIG. 6.

In the embodiment, represented by the tree of FIG. 6, the non-primary recording devices 140 begin, at the bottom of the tree, by synchronizing their clocks with the primary recording device 140 as described above. Going one level up, the primary recording device 140 synchronizes its clock to the client device 106. However, when the primary recording device 140 adjusts its clock (meaning its $\alpha$ and $\beta$ values) as part of synchronizing with the client device 106, this invalidates the clock synchronization of the non-primary recording devices 140 below it in the tree. There are a few ways to resolve this.

In some embodiment, the recording devices 140 below it in the tree are left to re-sync on their own, and eventually compensate for this change via the closed-loop correction described above. This could be expedited by the primary recording device 140, via its cascading clock sync engine 408, notifying them to reset their synchronization and start to resynchronize. A potential downside is that restarting the synchronization process creates discontinuities and step-changes in the clock, which would break any application which depends on a continuous clock source (i.e. recording media). Therefore, such an embodiment is better suited to use cases when no application is currently active (e.g. nothing is being recorded). In one such embodiment, the resynchronization may potentially be sped up by sending information to nodes further down in the tree about how much the source-of-truth clock has changed, to allow them to simply apply a correction to their $\alpha$ and $\beta$ values rather than starting over and recalculating their $\alpha$ and $\beta$ from scratch.

In some embodiments, e.g., where the previous approach is insufficient (i.e. while recording), changes are smoothed. In such embodiments, correction values are sent down the tree and are applied over a sufficiently-long period of time. For example, when the recording device 140 determines that it needs to change its $\beta$ value from 1.0 to 1.1 (meaning it's now 100 ms behind the client device's clock), it could increase its $\alpha$ value by 0.1% for 100 seconds to artificially speed up its synchronized clock and catch up with the client device's clock, and then restore the original $\alpha$ value and the new $\beta$ value after this 100 second period. This applies corrections in a manner which are not noticeably destructive to the media recording. These changes can also be coordinated with the devices further down in the tree, in a cascading fashion.

In one embodiment, the coordination with devices 132/106/140 further down the tree is only applied for the recording device 140 network synchronization use cases to avoid any compounding of error between the different levels of synchronization.

In reference to FIG. 6, an embodiment in which the non-primary recording devices 140 begin by synchronizing their clocks with the primary recording device 140 is described above, in another embodiment (not shown), each recording device 140 in the network, whether primary or secondary, begins by synchronizing its clock to a commonly accessible, high-accuracy clock, which, as a byproduct, synchronizes the non-primary, or "secondary" recording device(s) 140 to the primary recording device 140. The commonly accessible, high-accuracy clock may vary depending on the embodiment (e.g., whether the recording devices 140 are on a common Wi-Fi or Bluetooth network, whether the recording devices have a wired (or low latency) connection to a common device with a clock, etc.).

For clarity and convenience, cascading synchronization using a commonly accessible, high-accuracy clock is described below with reference to an example in which the commonly accessible, high-accuracy clock is a Wi-Fi TSF clock. However, it should be recognized that this is merely an example and other embodiments and use cases may use a different commonly accessible, high accuracy clock, which may be analogous to the Wi-Fi TSF clock. In one embodiment, using the clock synchronization strategy and algorithm described above, e.g., with reference to synchronization algorithm determiner 404, each recording device 140, whether primary or secondary, in the network synchronizes its clock to the same Wi-Fi TSF clock. The result is that the primary recording device 140 has clock $C_{1tsf}=\alpha_p C_{2p}+\beta_p$, where the subscript "p" notation indicates that the values are associated with the primary device, and the secondary device has clock $C_{1tsf'}=\alpha_s C_{2s}+\beta_s$, where the subscript "s" notation indicates that the values are associated with the secondary device. Both the first and second recording devices 140 are synchronizing to the same Wi-Fi TSF clock, so the $C_1$ values are near identical, but may differ slightly (e.g. tens of microseconds), which is indicated in the notations as $C_{1tsf}$ for the primary device 140 and $C_{1tsf'}$ for the secondary recording device 140. Therefore, the apostrophe ('), or prime, notation does not indicate a derivative, but a potentially different value corresponding value for the secondary device 140.

Still referring to embodiments where each recording device 140 in the network synchronizes to a commonly accessible, high-accuracy clock, the primary recording device 140 synchronizes to the phone (or other client device 106) using $C_{1tsf}$ as the primary recording device's local clock ($C_2$), resulting in the formula $C_{1phone}=\alpha_{p'} C_{1tsf}+\beta_{p'}$. The apostrophe, or prime, notation here does not indicate a derivative, but that the α and β values for the primary device ($\alpha_{p'}$ and $\beta_{p'}$) likely differ from those determined above ($\alpha_p$ and $\beta_p$) with respect to the Wi-Fi TSF clock. The primary recording device 140 then communicates these $\alpha_{p'}$ and $\beta_{p'}$ values, via the cascading clock synchronization engine 408, to the other (secondary) recording device(s) 140 in the network. Because both the clocks of the primary and secondary recording devices 140 ($C_{1tsf}$ and $C_{1tsf'}$, respectively) are synchronized to the TSF clock, they are also synchronized to each other with a high degree of accuracy, e.g., on the order of tens of microseconds. Therefore, secondary recording device(s) 140 can integrate the $\alpha_{p'}$ and $\beta_{p'}$ values directly in their own calculations to synchronize with the phone ($C_{1phone'}=\alpha_{p'} C_{1tsf'}+\beta_{p'}$). Here again, the apostrophe, or prime, notation does not indicate a derivative, but the $C_1$ clock value for a phone (i.e. $C_{1phone'}$) determined by, and using, the secondary recording device's local clock ($C_{2s}$), since $C_{1tsf'}$ is a function of $C_{2s}$.

The event scheduler 410 schedules one or more future events among a plurality of synchronized devices. One of the benefits of having synchronized clocks is an ability to schedule an action at a time in the future, so that all devices perform the action at the same time. For example, when the client device 106 and recording device 140 have synchronized clocks as described above, when the user starts a recording on the client device 106, it can tell the recording device 140 to start the recording at a specific time in the near future and schedule its own recording to start at that same time and, therefore, guarantee that the media recorded by the client device 106 and the media recorded by the recording device 140 are aligned.

For example, consider a use case where the system 100 comprises two recording devices 140 and a client device 106 and the user 112 wishes to capture media on all three devices (video on the client device 106 and audio on the recording devices 140). Further, assume that the recording devices 140 have been configured to communicate with each other over Wi-Fi. Once this connection is established, in one embodiment, the recording devices 140 negotiate and agree on one of the two recording devices 140 being the primary recording device. Both recording devices 140 begin independently synchronizing to the TSF clock. Once the primary recording device has synchronized to the TSF clock, it begins sending its α and β value to the other recording device 140. After the other recording device has completed its synchronization to the TSF clock, it starts using its own α and β values as well as the α and β values it received from the primary recording device 140 to generate its synchronized $C_1$ clock. At this point, the two recording devices have their clocks synchronized.

Next, assume the client device 106 connects to the primary recording device 140 over BLE. Once this happens, the primary recording device 140 starts to send requests to the client device 106 to request its clock value and determine the α and β values which it needs to use to synchronize to the client device's clock. Once the primary recording device 140 does this, since we are in a state where a step-change to the clock is not problematic (i.e. the system 100 is not recording), the primary recording device 140 may immediately adjust its clock based on these new α and β values to match with the client device's clock. The other recording device 140 then detects that its clock synchronization with the primary recording device has significant error and restarts its synchronization. After doing so, both recording devices 140 are synchronized to the client device 106. It may be worth noting that the accuracy of the TSF-based synchronization used to synchronize the two recording devices 140 is significantly higher than the synchronization which is done over BLE between the primary recording device 140 and the client device 106, with the former being in the tens of microseconds and the latter being in the tens of milliseconds.

Next, assume the user 112 starts a recording by pressing a user interface button in the client application 107. At that point, the client device 106, via the event scheduler 410, schedules its own video recording for a time in the future (potentially 100 ms) and sends a message to both the recording devices (through a previously configured communication network) to start their recording at the same (scheduled) time. This way, all three devices capture media with the same starting time.

As the recording goes on, due to various physical limitations and process variations between the devices, their clocks may drift out of synchronization. Let's assume that, at 1 minute into the recording, the client device's clock slows down by 0.1%. Soon after, the primary recording device realizes that its synchronized clock has sufficient error with the client device's clock to warrant a correction. The primary recording device 140 may sends a message to the other recording device 140 that it is going to update its α and β values to correct for this error starting at a specific time in the future. This way, both the recording devices 140 are able to maintain accurate synchronization with each other, even as they both adjust to compensate for the error detected by the primary recording device 140 between its clock and the client device's clock.

The end result is recorded media across the three devices, which started at the same time, and compensated for drift and changes in clocks to maintain that synchronization throughout the duration of the recording such that there are no perceptible artifacts or glitches as a result in the recorded media. Additionally, phase shifting is prevented to maintain phase-accurate alignment of audio waveforms and avoid, e.g., destructive interference.

It should be noted that the cascading synchronization of FIG. 6 may be duplicated any number of times. For example, a plurality of recording devices 140 and a mobile phone (i.e. a client device 106) associated with a first user at a first physical location may perform a cascading synchronization to the server 132, and a second set of recording devices 140 and a second mobile phone associated with a second user at a second, remote, physical location may perform a cascading synchronization to the server 132, thereby synchronizing the devices at the various physical locations and enabling remote collaboration, potentially in real-time.

In some embodiments, the synchronization engine 302 includes a rate adjuster. In one embodiment, the rate adjuster 412 adjusts one or more of a recording rate and a playback rate. For example, after the clocks are synchronized, each recording device 140 and client device 106 may, via the rate adjuster 412, be able to adjust the rate at which they record media to match the desired recording rate (e.g. frames per second for video and samples per second for audio).

In some embodiments, for recording devices 140, the firmware (not shown) running on them has control over the clock driving the analog-to-digital converter which is sampling the microphones. Therefore, the recording device 140 can adjust the speed of this clock to match the desired recording rate with regards to its synchronized clock. In some embodiments, for the client device 106, the rate adjuster 412 controls the presentation time of each frame of the video, which finely-controls the time at which each frame of the video is played back to align with our synchronized clock.

In some embodiments, for scenarios where adjusting the media recording rate in real time is impractical or insufficient, the rate adjuster 412 may capture metadata in parallel to, or embedded in, the media recording. In one embodiment, this metadata contains information on how the media should be resampled in post-processing or presented at the time of playback. The metadata is generated using the synchronized clock as a reference. In some embodiments, for scenarios where clocks were not synchronized during the recording, but became synchronized after the recording, post-processing can be performed to align the recordings and account for uniform drift across the recordings.

Goals for recording high-quality audio often include (1) maximizing dynamic range, (2) maximizing effective resolution of the digital representation of the audio data, and (3) accurately preserving dynamics of the audio source. In existing systems, users maximize these parameters of a recording system for a specific audio source by adjusting the analog gain, or level of the microphone ahead of time. However, this requires an experienced user who can properly set the gain based on the specific audio source they are recording as well as the recording environment. Moreover, even experienced users may not be able to perfectly predict the best gain ahead of time for an entire recording. When the gain is set too high, louder parts of the recording are clipped, resulting in perceptible distortion in the recorded audio. When the gain is set too low, the dynamic range of the system is not be fully utilized, which may result in the noise floor of the microphone distorting the audio, and limiting of the effective digital resolution, leading to a worse quality quantization of the analog audio data.

The disclosure herein beneficially describes a level engine 304, which, according to one embodiment, implements an automatic leveling algorithm which optimizes the gain of the microphone on-the-fly to avoid clipping, while preserving maximum dynamic range and digital resolution, and without distorting the dynamics of the audio source. The advantage of the approach described herein over conventional level setting is that it preserves the dynamics of the audio source, and significantly reduces the chance of clipping in the recorded media, without requiring a user to manually adjust the levels before the start of the recording, or even know (conceptually or in practice) how to properly adjust levels.

Figure 7:
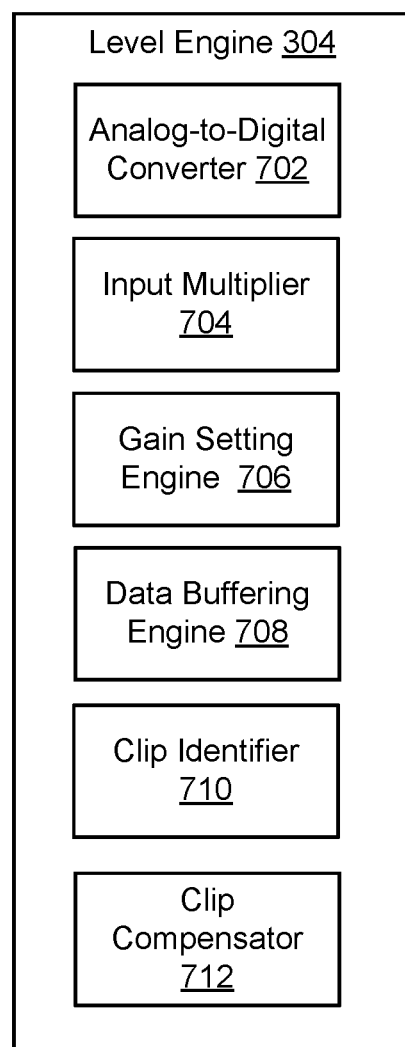
FIG. 7 presents a block diagram of an example level engine, according to one embodiment.

Referring now to FIG. 7, a block diagram illustrating an example level engine 304 is described in more detail according to one embodiment. In one embodiment, the level engine 304 includes an analog-to-digital converter 702, an input multiplier 704, a gain setting engine 706, a data buffering engine 708, a clip identifier 710, and a clip compensator 712.

The components 702-712, or a subset thereof, can be software or routines for providing the features and functionalities described herein. In one embodiment, the engines or subset thereof are a set of instructions executable by the processor 202. In one embodiment, the components 702-712, or subset thereof, are stored in the memory 204 and are accessible and executable by the processor 202. In one embodiment, the components 702-712, or subset thereof, are adapted for cooperation and communication with the processor 202 and other components of the computing device 200.

For clarity and convenience, the description herein refers to examples in which two different gains are applied to the analog signal, i.e., a higher gain and a lower gain. However, it should be recognized that implementations in which more than two gains are applied are within the scope of this disclosure.

The analog-to-digital converter 702 converts an analog signal into digital data representing the analog signal. In some embodiments, the analog signal includes an analog audio signal from a microphone. In one embodiment, the analog-to-digital converter 702 receives multiple, analog inputs and generates multiple, digital outputs, respectively. In one embodiment, the analog-to-digital converter 702 receives an analog input and generates multiple sets of digital data. Regardless, the analog-to-digital converter 702 generates a first set of digital data based on the analog signal (e.g. an audio signal) at a first gain, and a second set of digital data based on the analog signal (e.g. the audio signal) at a second gain.

As discussed below, with reference to FIGS. 8A-8C, in some embodiments, the analog-to-digital converter 702 may adjust the gain on-the-fly and the gain setting engine 706, below, communicates with and instructs the analog-to-digital converter to adjust the gain on-the-fly.

The input multiplier 704 connects a microphone to multiple inputs of an analog-to-digital converter 702. In one embodiment, the input multiplier 704 connects a microphone (not shown) to two separate inputs of an analog-to-digital converter 702. For example, a microphone (not shown) of the recording device 140 is connected to two inputs of an analog-to-digital converter 702 of that recording device 140.

The gain setting engine 706 sets multiple different gains. In one embodiment, the gain setting engine 706 sets a higher analog gain for a first input and a lower analog gain for the second input. For example, the gain value of a first input is set to a first, higher value that risks clipping, but maximizes dynamic range, and the gain value for the second input is set to a second, lower value that does not risk clipping, but has a lower dynamic range.

The initial analog gains may be set differently depending on the embodiment. For example, the initial gains may be set to default values. Those default values may be at a preset level and/or preset distance apart (e.g. 10 dB apart). In another example, an initial value may be based in part on one or more past recordings or samples (e.g. by analyzing the range of levels seen in the user's past recordings to determine the optimal high and low gains).

The data buffering engine 708 buffers digital data produced by the analog-to-digital converter 702. For example, the data buffering engine 708 buffers first digital data, generated by the analog-to-digital converter 702 using the first, higher gain, and second digital data, generated by the analog-to-digital converter 702 using the second, lower gain.

The clip identifier 710 identifies an occurrence of a clip. For example, the clip identifier 710 compares the buffered digital data to the clipping threshold and determines a clip has occurred when the clipping threshold is satisfied and identifies a time at which the clipping threshold is satisfied.

In some embodiments, the digital data produced by only one of the two inputs (per microphone) is actually stored by the level engine 304 as part of the recording, but both are buffered by the data buffering engine 708 and constantly monitored by the clip identifier 710.

In one embodiment, when the clip identifier 710 detects that the buffered data from the input with the higher gain clips, it stores the buffered data captured by the input with the lower gain for the period of time during which the clipping event occurred. The result is that the recorded audio does not have any clipping. However, the clip identifier captures the sample (or time) at which this switch was made in metadata alongside the recorded audio so that during post-processing, the clip compensator 712 may generate a consistent, effective gain throughout. This post-processing involves digitally reducing the volume of the portion captured at the higher gain value to match the lower gain value, which may occasionally be referred to as volume reduction or similar. Because each microphone is recorded through two different inputs, as long as we are only changing the gain of the non-active input, there is no need to worry about distortion within the analog-to-digital converter 702 caused by a change in gain.

The features and functionalities of the level engine 304 and its subcomponents may be more clearly understood by discussing some example scenarios. Accordingly, FIGS. 8A-C and 9A-C provide example input signals and processing thereof according to some embodiments.

Figure 8A:
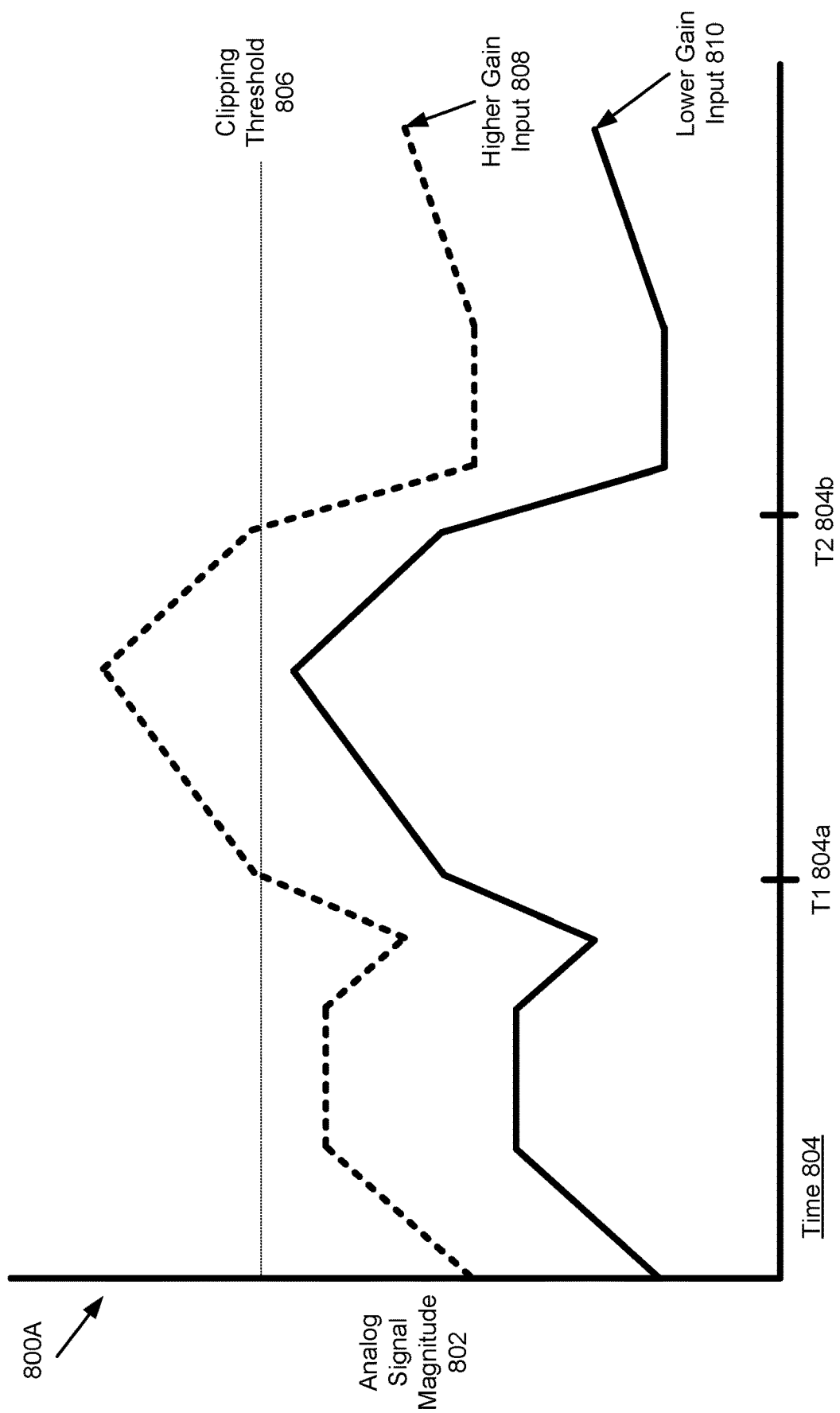
FIG. 8A-C presents example input signals and the processing thereof, according to certain embodiments of the present disclosure.
Figure 8B:
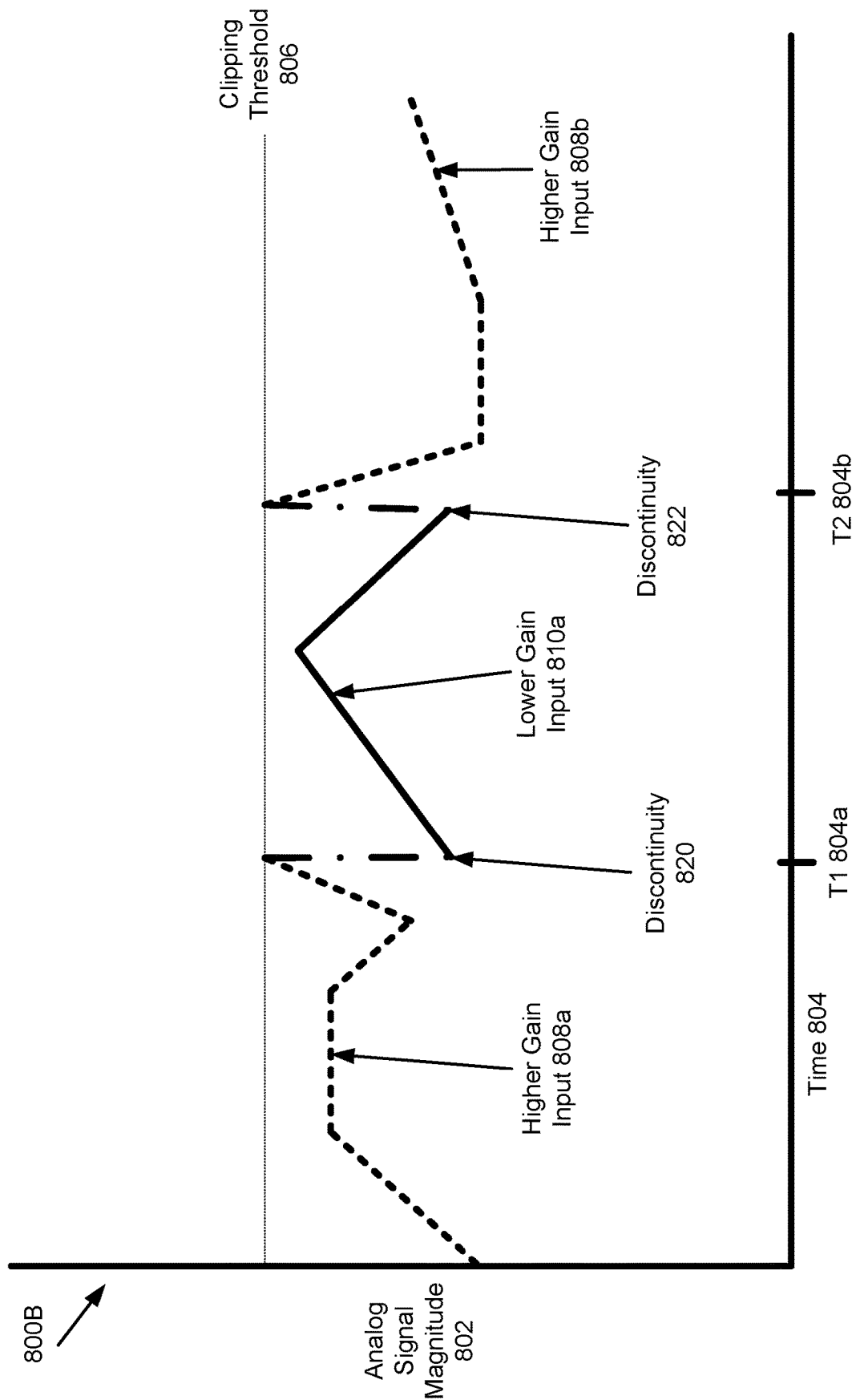
Figure 8C:
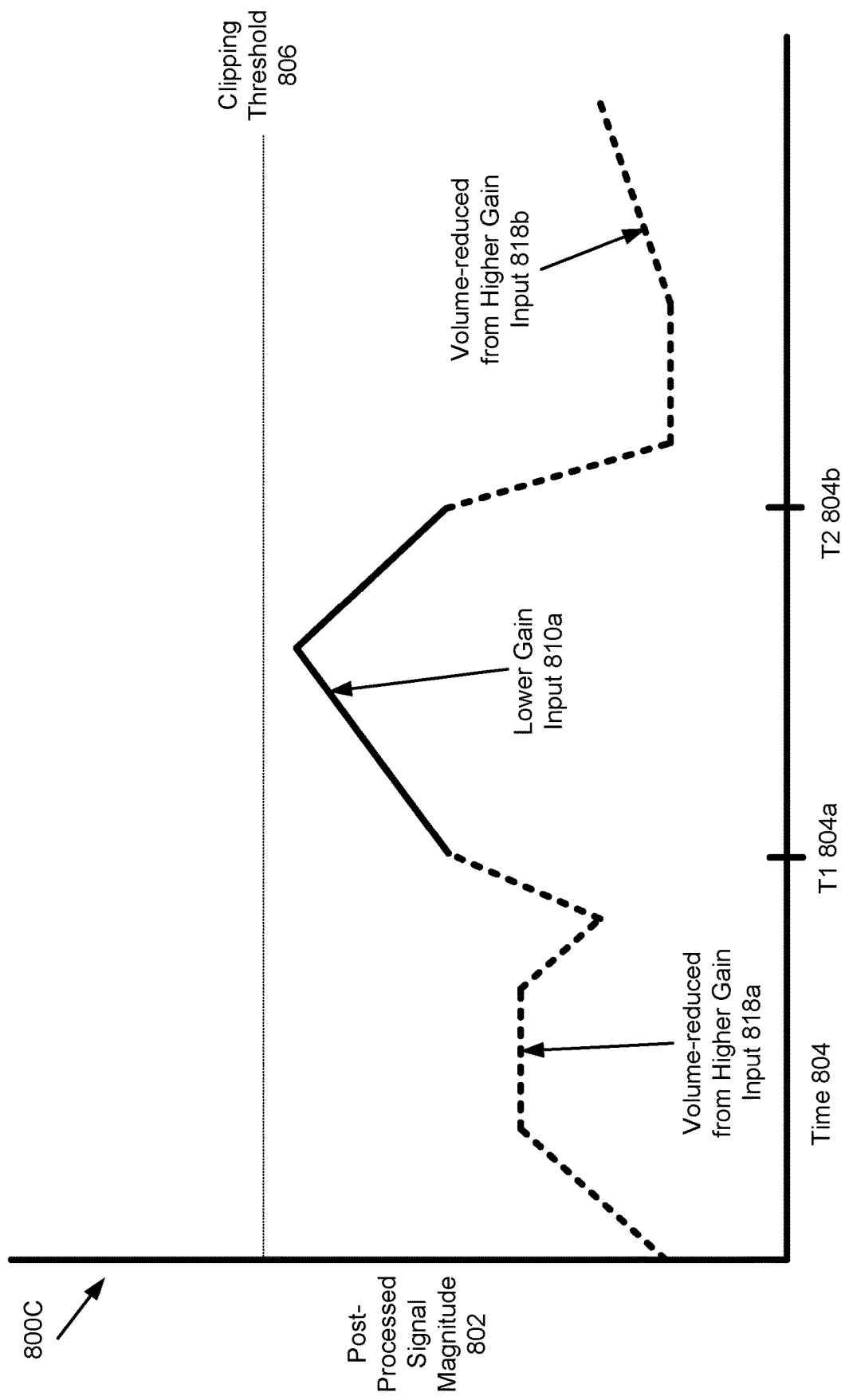

Referring now to FIGS. 8A-C, an example of autoleveling, which avoids clipping, is described according to one embodiment. Referring to FIG. 8A, diagram 800A, where the vertical axis is associated with an analog signal magnitude 802, the horizontal axis is time 804, and a clipping threshold 806 is illustrated by a horizontal line. Also illustrated is a higher gain input 808 illustrated by the dotted line, and a lower gain input 810 illustrated by the solid line. As illustrated, a portion of the higher gain input between time T1 804a and time T2 804b exceeds the clipping threshold 806.

In one embodiment, the audio recording produced by the level engine 304 is based on the higher gain input 808 until T1 804a at which point the clip identifier 710 identifies that clipping occurs, as the higher gain input 808, exceeds clipping threshold 806. After time T1 804a, the audio recording produced by the level engine 304 is based on the lower gain input 810. In some embodiments, the audio recording produced by the level engine 304, reverts to being based on the higher gain input 808, when clipping no longer occurs. For example, at time T2 804b, as is described in FIGS. 8B-C. In alternative embodiments, once the audio recording produced by the level engine 304 is based on the lower gain input 810, additional clipping is anticipated, so the recording from T1 804a on is based on the lower gain input 810 (not shown).

Now referring to FIG. 8B, as previously mentioned, the level engine 304 generates a recording based on the higher gain input 808 where that input is not clipped, i.e., portions 808a and 808b, and the recording is based on the lower gain input 810 where the higher gain input 808 is clipped. While this avoids clipping, without doing more, the signal would include a discontinuity 820 at T1 804a, when transitioning from the higher gain input portion 808a to the lower gain input portion 810a, and at T2 804b, when transitioning from the lower gain input portion 810a back to the higher gain input portion 808b.

Referring now to FIG. 8C, to compensate for these discontinuities, the clip compensator 712 receives metadata generated by the clip identifier 710, which identifies when these changes (i.e. T1 and T2) occur and what the effective analog gain adjustment was at the time, and digitally lowers the gain accordingly on portions 808a and 808b of the higher gain input 808, to produce the "volume-reduced" higher gain inputs 818a and 818b, respectively. While the post-processed signal 818a, 810a, and 818b, which is recorded, appears identical in shape to the lower gain input 810 of FIG. 8A (except that portions 818a and 818b are illustrated as dotted lines), it should be recognized that the post-processed signal 818a, 810a, and 818b provides benefits over merely using the lower gain input 810. For example, by volume reducing portions 808a and 808b of FIG. 8B to generate portions 818a and 818b of FIG. 8C, the noise floor of those regions is reduced, dynamic range is preserved, and the dynamics of the recording are maintained.

As mentioned, FIGS. 8B and 8C describe an embodiment in which the audio recording produced by the level engine 304, reverts to being based on the higher gain input 808, when clipping no longer occurs. FIGS. 8A-C illustrate an example in which once clipping is identified, additional clipping is anticipated is described according to one embodiment.

Similar to FIGS. 8A-C, FIGS. 9A-C include a vertical axis associated with a signal magnitude, a horizontal axis associated with time 904, and a clipping threshold 906 illustrated by a horizontal line. A first input is initially associated with a higher gain than the second input, as is illustrated by the dotted line representing the first input 908a being positioned above the solid line representing the second input 910 until T2 904b.

Figure 9A:
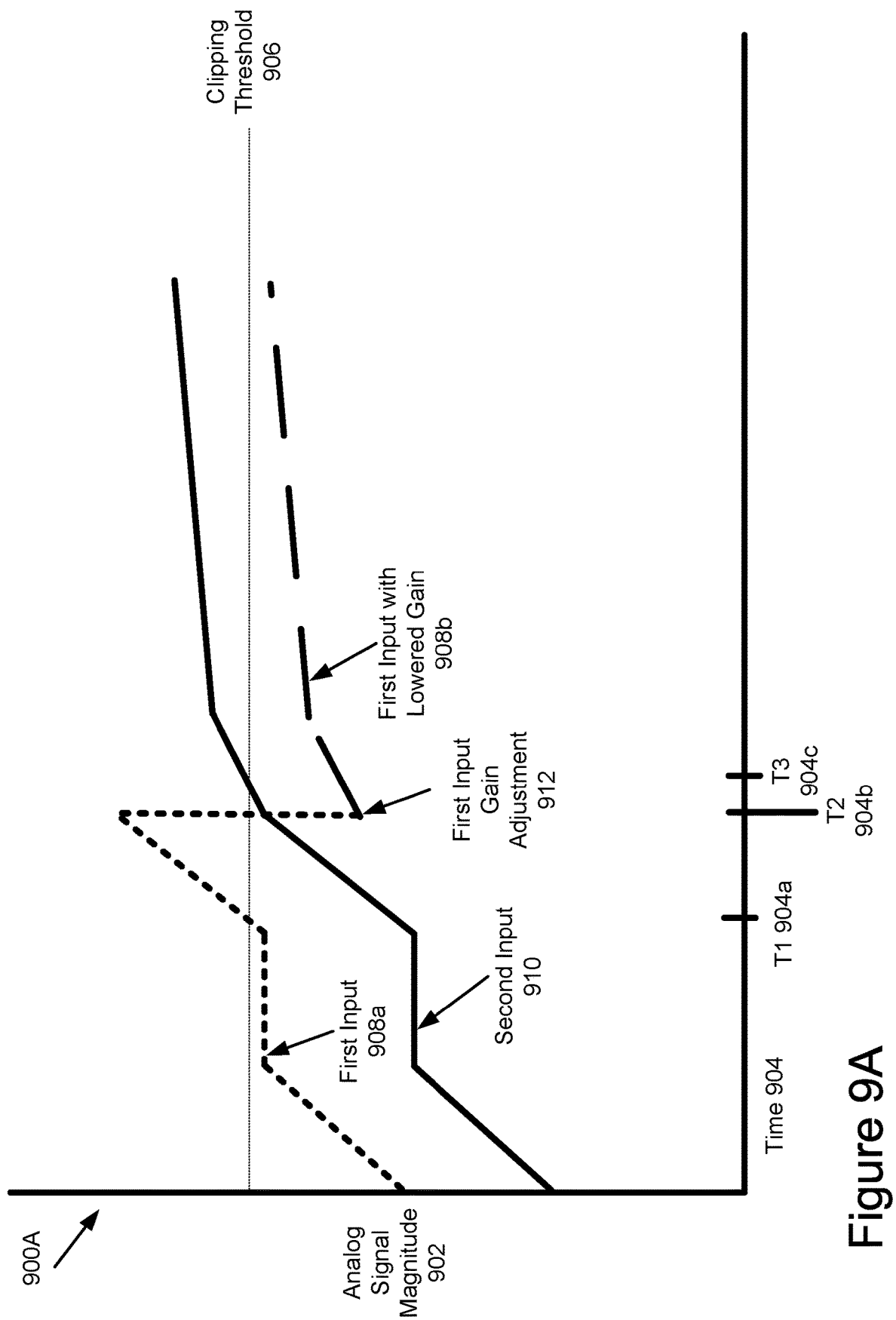
FIG. 9A-C presents other example input signals and the processing thereof, according to certain embodiments of the present disclosure.

At time T1 904a, the first input associated with its original gain, illustrated by the dotted portion 908a of the first input, satisfies the clipping threshold 906. At time T2 904b, the second input 910 associated with its original gain, which is illustrated by a solid line, approaches the clipping threshold 906, and the first audio input is associated with new, lower (i.e. lower than the original gain associated with either the first input or the second input) gain by the gain setting engine 706, as is indicated by discontinuity at 912. The first signal associated with the lowered gain is illustrated by the dashed portion 908b of the first input. In some embodiments, the gain associated with the first input is lowered immediately after the first input satisfies the clipping threshold 906, while, in other embodiments, the gain associated with the first input is lowered when the second input satisfies the clipping threshold, i.e., T3 904c (not shown), while, in yet other embodiments, the gain associated with the first input is lowered when the second input gets within a predefined range of the clipping threshold 906, i.e. at T2 904b, as illustrated in FIG. 9A.

At time T3 904c, the second input associated with its original gain satisfies the clipping threshold 906. While not illustrated, the second input could be associated with a new gain lower than the current gain associated with the first input, and the cycle may be repeated assigning progressively lower gains to the inputs to eliminate clipping.

Figure 9B:
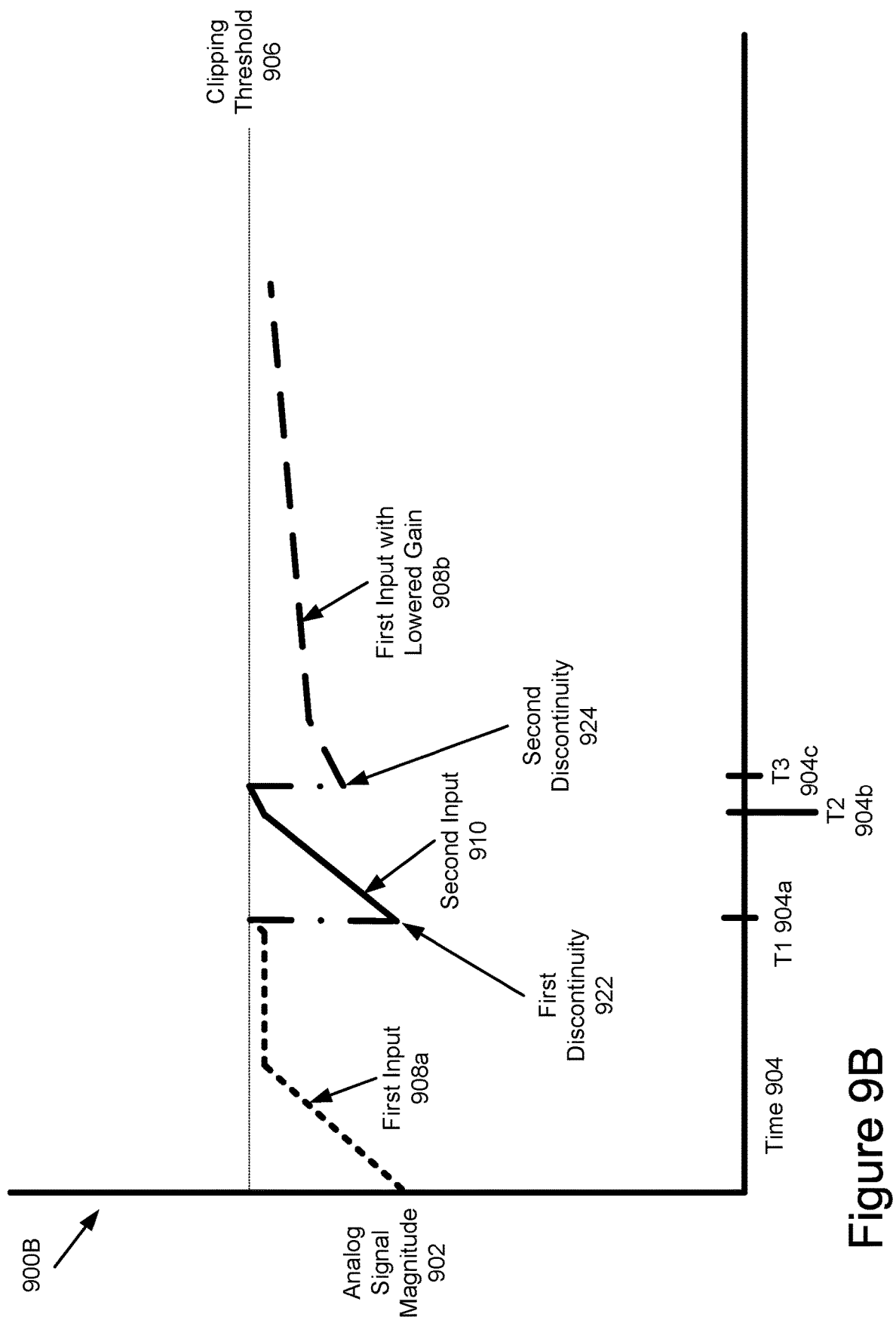

FIG. 9B is a diagram showing the portions of the inputs with the greatest gain that do not satisfy the clipping threshold 906. Similar to FIG. 8B, FIG. 9B illustrate discontinuities 922 and 924, which occur where there is a change in which input has the greatest gain and does not satisfy the clipping threshold 906.

Figure 9C:
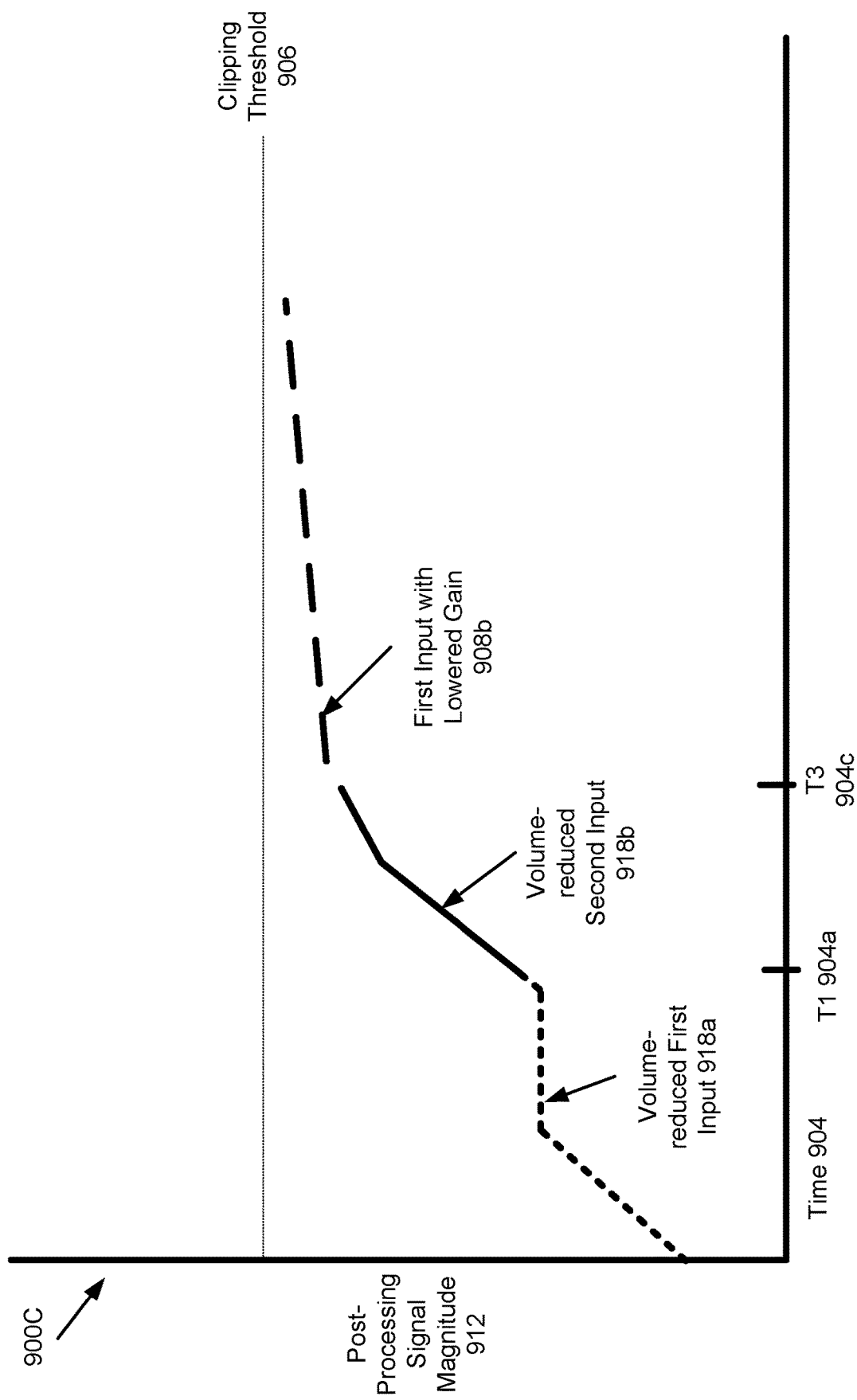

Referring now to FIG. 9C, to compensate for the discontinuities 922 and 924, the clip compensator 712 receives metadata generated by the clip identifier 710, which identifies when these changes (i.e. T1 and T3) occur and what the effective analog gain adjustment was at the time, and digitally lowers the gain accordingly on portion 908a of the first input, to produce the "volume-reduced" first input 918a, and lowers the gain accordingly on portion 910 of the second input, thereby generating a post-processing signal including portions 918a, 918b and 908b, which comprises the audio recorded to file.

While not illustrated, in some embodiments, when the level of the input with the highest gain (e.g. the first input) is not within a predefined range of the clipping threshold (i.e. not close to being clipped), the gain setting engine 706 may raise the gain associated with the unused input (e.g. the second input that initially is associated with a gain lower than the first input is raised to exceed the gain associated with the first input) and switch to that input. Accordingly, in some embodiments, the level engine 304 may dynamically raise and lower the gains associated with the inputs, thereby reducing the risk of clipping while preserving dynamic range.

Example Method Embodiments

Figure 10:
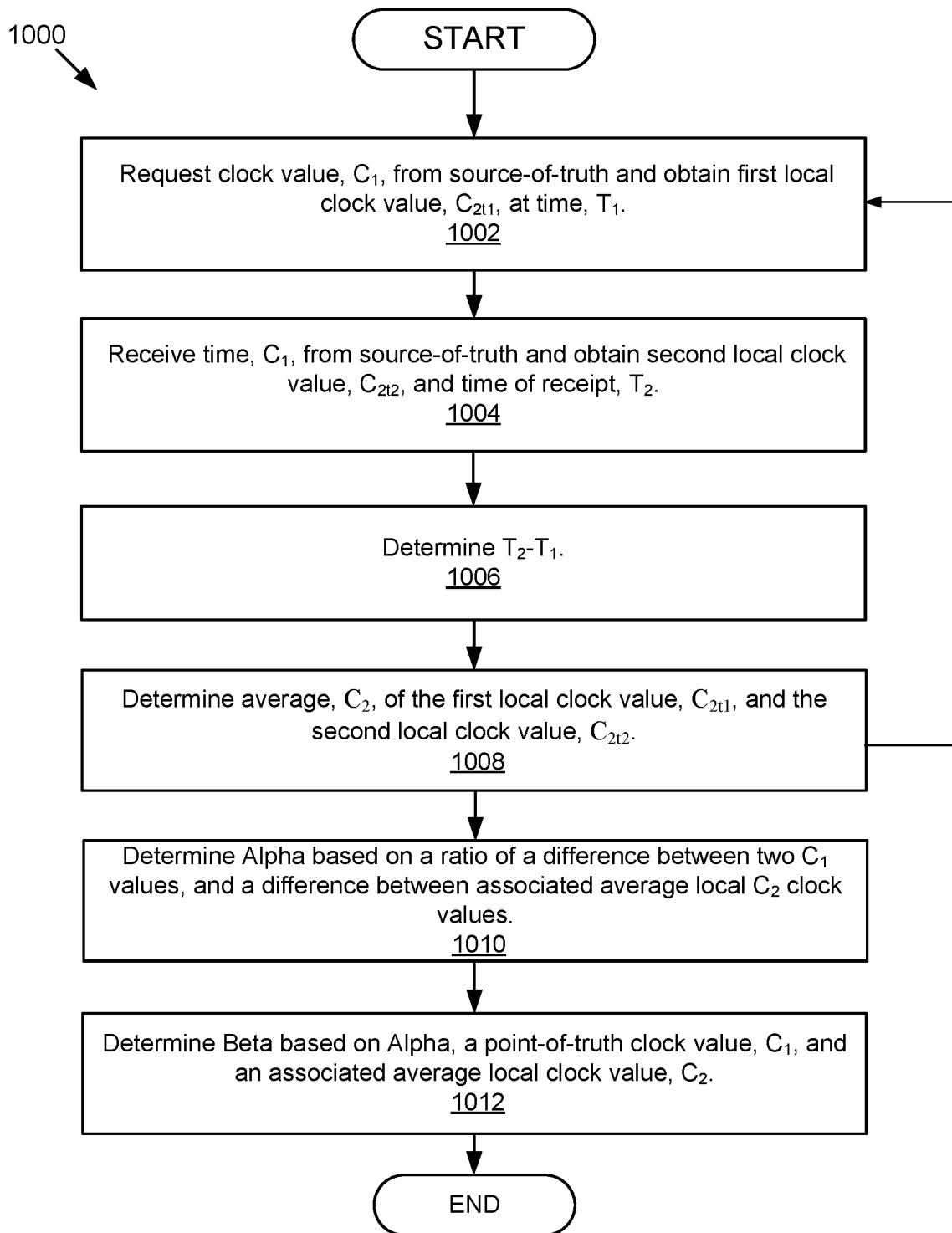
FIG. 10 presents a flowchart illustrating an example method for clock synchronization, according to certain embodiments of the present disclosure.

FIG. 10 presents a flowchart illustrating a method 1000 for clock synchronization according to certain embodiments of the present disclosure. At block 1002, the synchronization algorithm determiner 404 requests a clock value, $C_1$, from the source-of-truth and obtains a local clock value, $C_{2t1}$, at that time of request, $T_1$. At block 1004, the synchronization algorithm determiner 404 receives the clock value, $C_1$, from the source-of-truth and obtains a second local clock value, $C_{2t2}$, and the time of receipt, $T_2$. At block 1006, the synchronization algorithm determiner 404 determines the difference between $T_1$ and $T_2$ as $T_2-T_1$. At block 1008, the synchronization algorithm determiner 404 determines an average of the first, local clock value, $C_{2t1}$, obtained at block 1002, and the second, local clock value, $C_{2t2}$, obtained at block 1004. Blocks 1002-1006 are repeated at least once before continuing to block 1010 in order to obtain another $C_1$ value and another average local clock value, $C_2$. At block 1010, the synchronization algorithm determiner 404 determines the alpha value based on a ratio of a difference between two $C_1$ values and a difference between the average, local clock values, $C_2$, associated therewith. At block 1012, the synchronization algorithm determiner 404 determines a beta value based on the alpha value determined at block 1010, the $C_1$ received at block 1004, and the average local clock value, $C_2$, determined at block 1008 for that $C_1$ received at block 1004, and the method 1000 ends.

Figure 11:
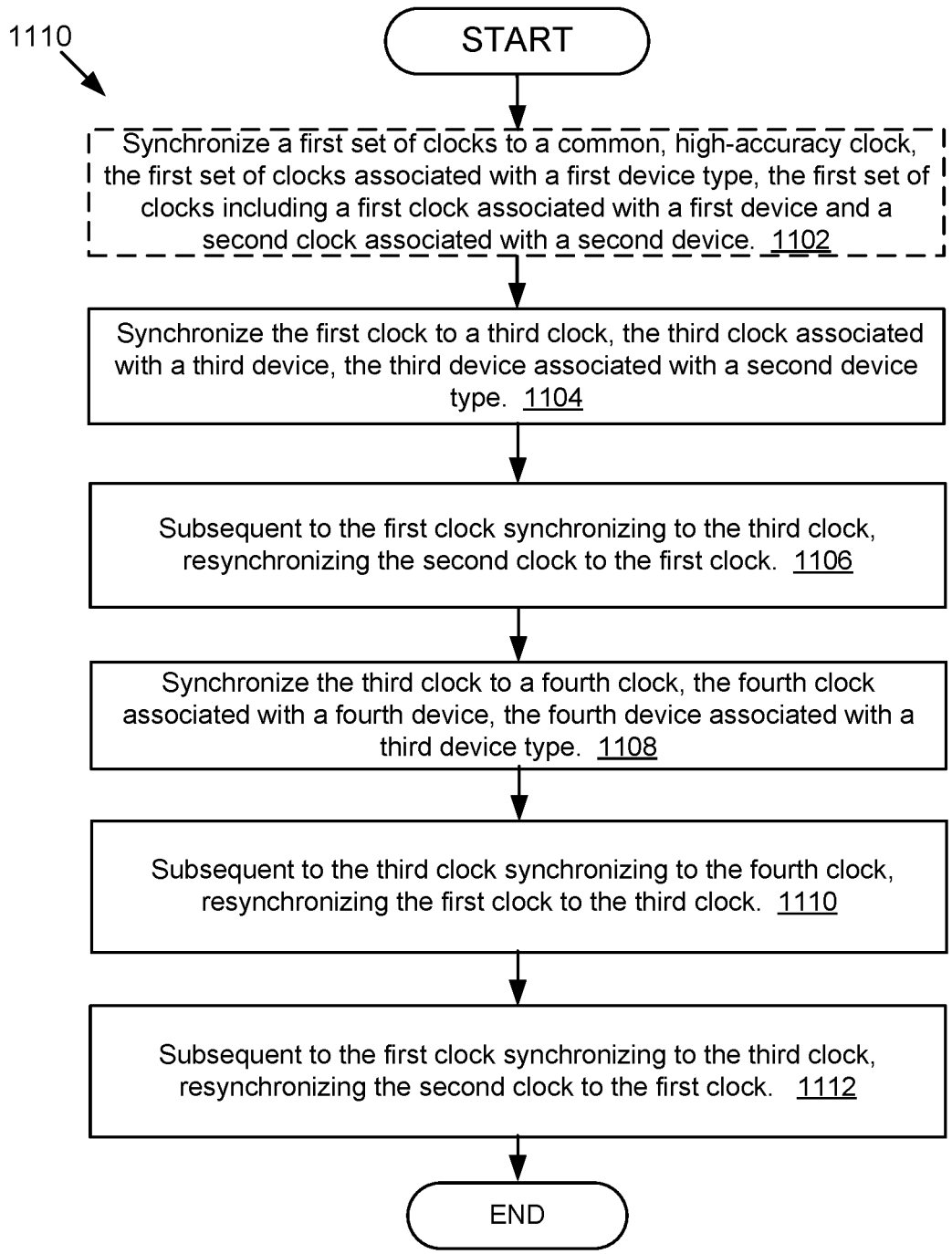
FIG. 11 presents a flowchart illustrating an example method for cascading synchronization, according to certain embodiments of the present disclosure.

FIG. 11 presents a flowchart illustrating an example method for cascading synchronization, according to certain embodiments of the present disclosure. At block 1102, the synchronization engine 302 optionally synchronizes a first set of clocks to a common, high-accuracy clock (e.g. a Wi-Fi TSF clock), where the first set of clocks associated with a first device type (e.g. a recording device 140 type), and the first set of clocks includes a first clock associated with a first device (e.g. a primary recording device 140) and a second clock associated with a second device (e.g. a secondary recording device 140). At block 1104, the synchronization engine 302 synchronizes the first clock to a third clock, where the third clock is associated with a third device (e.g. a mobile phone or other client device 106), the third device associated with a second device type (e.g. client device 106 type). At block 1106, the synchronization engine 302, subsequent to the first clock synchronizing to the third clock, resynchronizes a second clock (e.g. associated with a secondary recording device 140) to the first clock (e.g. associated with a primary recording device 140). At block 1108, the synchronization engine 302, synchronizes the third clock to a fourth clock, where the fourth clock is associated with a fourth device (e.g. a server 132), and the fourth device is associated with a third device type (e.g. a server 132 device type). At block 1110, the synchronization engine 302, subsequent to the third clock synchronizing to the fourth clock, resynchronizes the first clock to the third clock. At block 1112, the synchronization engine 302, subsequent to the first clock synchronizing to the third clock, resynchronizes the second clock to the first clock, and the method 1100 ends.

Figure 12:
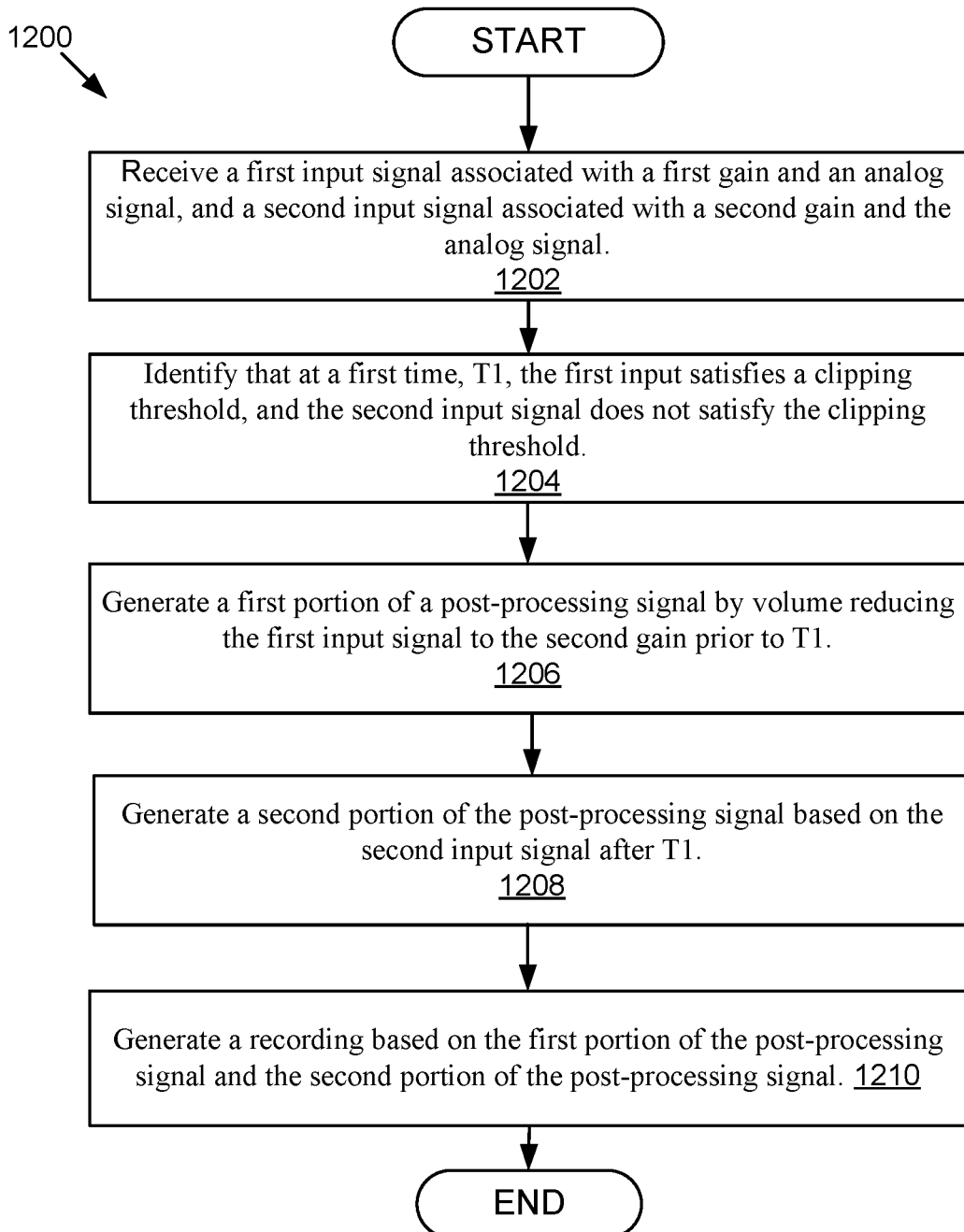
FIG. 12 presents a flowchart illustrating an example method for auto-leveling, according to certain embodiments of the present disclosure.

FIG. 12 presents a flowchart illustrating an example method for auto-leveling, according to certain embodiments of the present disclosure. At block 1202, the data buffering engine 708 receive a first input signal that is associated with a first gain and an analog signal and a second input signal that is associated with a second gain and the analog signal. At block 1204, the clip identifier 710 identifies that, at a first time, T1, the first input satisfies a clipping threshold, and the second input signal does not satisfy the clipping threshold. At block 1206, the clip compensator 712 generate a first portion of a post-processing signal by volume reducing the first input signal to the second gain prior to the first time, T1. At block 1208, the clip compensator 712 generate a second portion of the post-processing signal based on the second input signal after time, T1. At block 1210, the clip compensator 712 generates a recording based on the first portion of the post-processing signal and the second portion of the post-processing signal, and the method 1200 ends.

Figure 13:
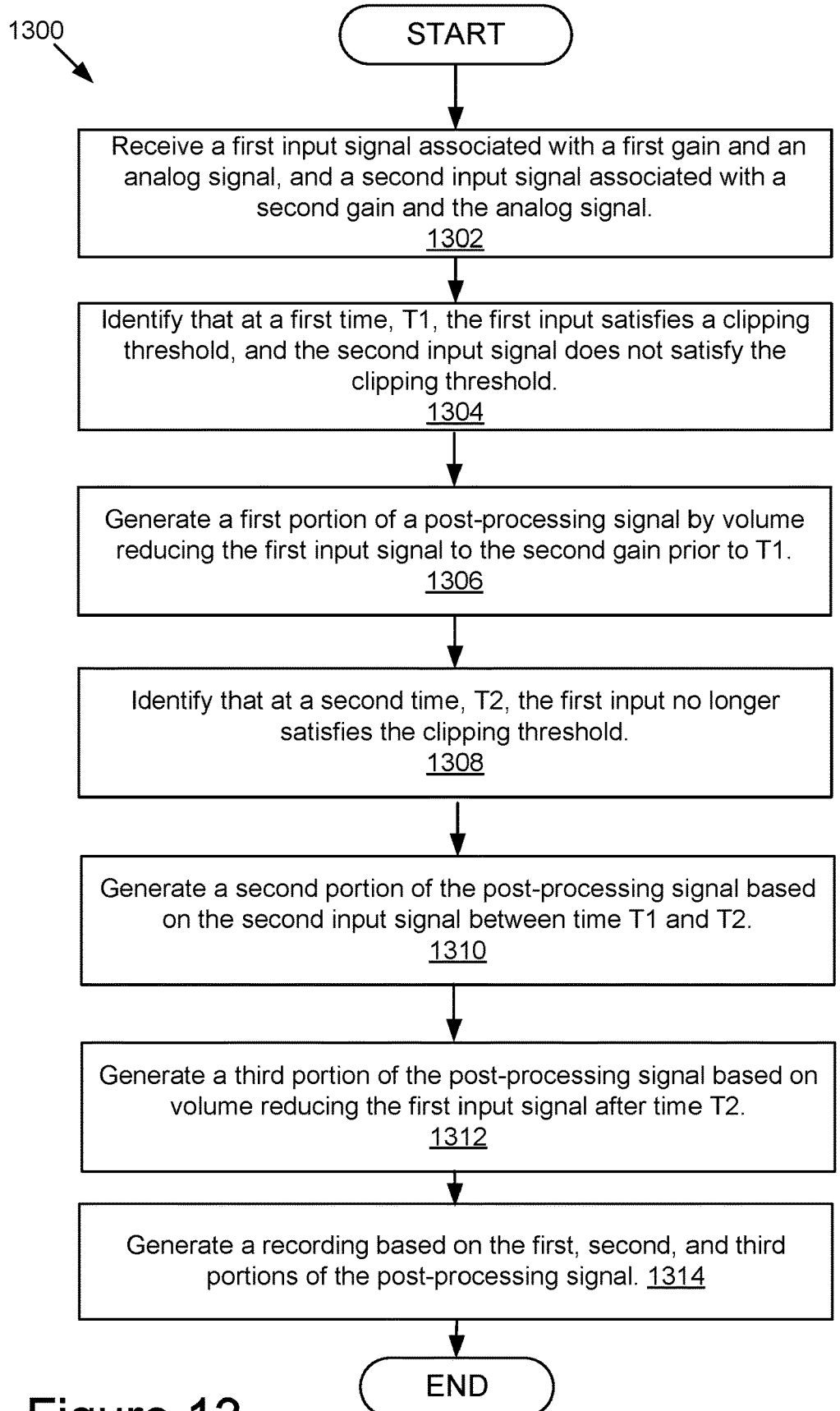
FIG. 13 presents a flowchart illustrating another example method for auto-leveling, according to certain embodiments of the present disclosure.

FIG. 13 presents a flowchart illustrating another example method for auto-leveling, according to certain embodiments of the present disclosure. At block 1302, the data buffering engine 708 receives a first input signal that is associated with a first gain and an analog signal, and a second input signal that is associated with a second gain and the analog signal. At block 1304, the clip identifier 710 Identifies that at a first time, T1, the first input satisfies a clipping threshold, and the second input signal does not satisfy the clipping threshold. At block 1306, the clip compensator 712 generates a first portion of a post-processing signal by volume reducing the first input signal to the second gain prior to T1. At block 1308, the clip identifier 710 identifies that at a second time, T2, the first input no longer satisfies the clipping threshold. At block 1310, the clip compensator 712 generate a second portion of the post-processing signal based on the second input signal between time T1 and T2. At block 1312, the clip compensator 712 generates a third portion of the post-processing signal based on volume reducing the first input signal after time T2. At block 1314, the clip compensator 712 generates a recording based on the first, second, and third portions of the post-processing signal, and the method 1300 ends.

Figure 14:
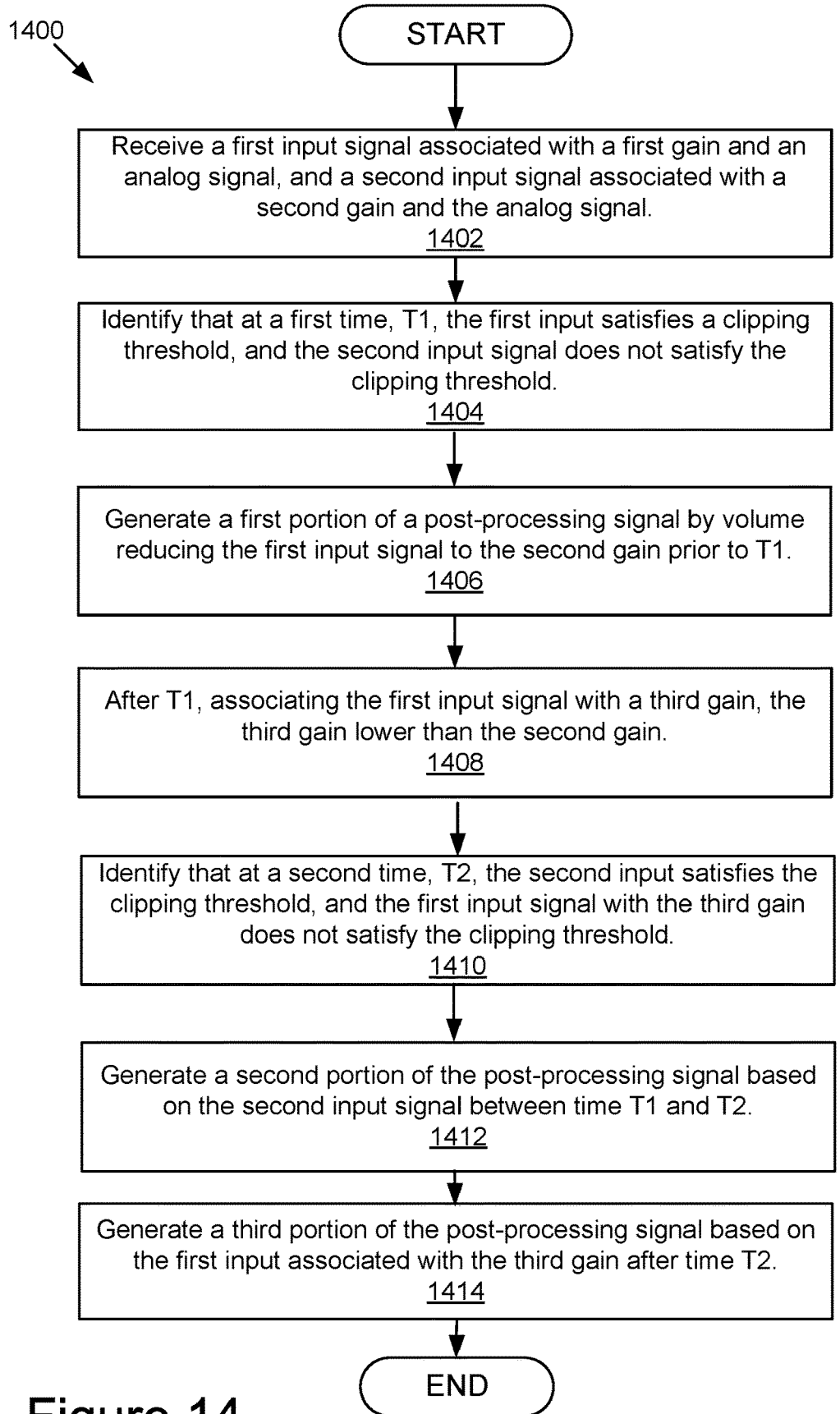
FIG. 14 presents a flowchart illustrating yet another example method for auto-leveling, according to certain embodiments of the present disclosure.

FIG. 14 presents a flowchart illustrating yet another example method for auto-leveling, according to certain embodiments of the present disclosure. At block 1402, the data buffering engine 708 receives a first input signal associated with a first gain and an analog signal, and a second input signal associated with a second gain and the analog signal. At block 1404, the clip identifier 710 identifies that at a first time, T1, the first input satisfies a clipping threshold, and the second input signal does not satisfy the clipping threshold. At block 1406, the clip compensator 712 generates a first portion of a post-processing signal by volume reducing the first input signal to the second gain prior to T1. At block 1408, gain setting engine 706, after T1, associates the first input signal with a third gain, the third gain lower than the second gain. At block 1410, the clip identifier 710 identifies that at a second time, T2, the second input satisfies the clipping threshold, and the first input signal with the third gain does not satisfy the clipping threshold. At block 1412, the clip compensator 712 generates a second portion of the post-processing signal based on the second input signal between time T1 and T2. At block 1414, the clip compensator 712 generates a third portion of the post-processing signal based on the first input associated with the third gain after time T2 and the method 1400 ends.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure not limited to implementation in any specific programming language, or for any specific operating system or environment. Accordingly, the disclosure is intended to be illustrative, but not limiting, of the scope of the subject matter set forth in the following claims.

What is claimed is:

1. A method comprising one or more processors:
   synchronizing a first clock to a second clock, the first clock associated with a first device, the first device associated with a first device type, the second clock associated with a second device, the second device associated with a second device type;
   subsequent to synchronizing the first clock to the second clock, synchronizing a third clock to the first clock, wherein the third clock is associated with a third device, the third device associated with the first device type;
   synchronizing the second clock to a fourth clock, the fourth clock associated with a fourth device, the fourth device associated with a third device type;
   subsequent to synchronizing the second clock to the fourth clock, resynchronizing the first clock to the second clock; and
   subsequent to resynchronizing the first clock to the second clock, resynchronizing the third clock to the first clock.

2. The method of claim 1 further comprising:
   prior to synchronizing the first clock to the second clock, synchronizing the first clock and the third clock to a common, high-accuracy clock.

3. The method of claim 2, wherein the common, high accuracy clock is a Wi-Fi TSF clock.

4. The method of claim 1, wherein the first device is a primary recording device, the second device is a client device, the third device is a non-primary recording device, and the fourth device is a server.

5. The method of claim 4, wherein the client device is a mobile phone.

6. The method of claim 1, wherein synchronizing one clock to another clock comprises:
   requesting a first clock value, $C_1$, from the another clock;
   obtaining a first local clock value, $C_{2t1}$, local to the one clock at a time, $T_1$, of the request;
   receiving the first clock value, $C_1$, from the another clock;
   obtaining a second local clock value, $C_{2t2}$, at a time, $T_2$, of receipt of the first clock value, $C_1$;
   determining a difference between the time, $T_1$, of the request and the time, $T_2$, of receipt of the first clock value, $C_1$;
   determining a first average local clock value by averaging the first, local clock value, $C_{2t1}$, and the second, local clock value, $C_{2t2}$;
   obtaining a second clock value, $C_1$, and a second average local clock value, $C_2$;
   determining a first value, alpha, based on a ratio of:
     a difference between the first clock value, $C_1$, and the second clock value, $C_1$, and
     a difference between the first average, local clock value, $C_2$, and the second average, local clock value, $C_2$; and
   determining a second value, beta, based on the first value, alpha, and one of:
     the first clock value, $C_1$, and the first average, local clock value, $C_2$, and
     the second clock value, $C_1$, and the second average, local clock value, $C_2$.

7. The method of claim 1 further comprising:
   scheduling an event across two or more of the first device, second device, third device, and fourth device.

8. The method of claim 1, further comprising:
   determining, whether media is being recorded; and
   responsive to determining that media is being recorded, smoothing the synchronizations and the resynchronizations over a period of time to avoid a discontinuity.

9. The method of claim 1, wherein the first device, the second device, and the third device are associated with a first user, and a fifth device, a sixth device, and a seventh device are associated with a second user at a location remote from the first user, the method further comprising:
   synchronizing a fifth clock to a sixth clock, the fifth clock associated with the fifth device, the fifth device associated with the first device type, the sixth clock associated with a sixth device, the sixth device associated with the second device type;

subsequent to synchronizing the fifth clock to the sixth clock, synchronizing a seventh clock to the fifth clock, wherein the seventh clock is associated with a seventh device, the seventh device associated with the first device type;

synchronizing the sixth clock to the fourth clock, the fourth clock associated with the fourth device, the fourth device associated with the third device type;

subsequent to synchronizing the sixth clock to the fourth clock, resynchronizing the fifth clock to the sixth clock; and subsequent to resynchronizing the fifth clock to the sixth clock, resynchronizing the seventh clock to the fifth clock.

10. The method of claim 9, wherein the first user and the second user remotely collaborate on a recording, the first device, the second device, the third device, the fifth device, the sixth device, and the seventh device synchronized to the fourth device.

11. A system comprising:
one or more processors;
a memory storing instructions that, when executed by the one or more processors, cause the system to:
synchronize a first clock to a second clock, the first clock associated with a first device, the first device associated with a first device type, the second clock associated with a second device, the second device associated with a second device type;

subsequent to synchronizing the first clock to the second clock, synchronize a third clock to the first clock, wherein the third clock is associated with a third device, the third device associated with the first device type;

synchronize the second clock to a fourth clock, the fourth clock associated with a fourth device, the fourth device associated with a third device type;

subsequent to synchronizing the second clock to the fourth clock, resynchronize the first clock to the second clock; and subsequent to resynchronizing the first clock to the second clock, resynchronize the third clock to the first clock.

12. The system of claim 11, wherein the instructions, when executed by the one or more processors, cause the system to:
prior to synchronizing the first clock to the second clock, synchronize the first clock and the third clock to a common, high-accuracy clock.

13. The system of claim 12, wherein the common, high accuracy clock is a Wi-Fi TSF clock.

14. The system of claim 11, wherein the first device is a primary recording device, the second device is a client device, the third device is a non-primary recording device, and the fourth device is a server.

15. The system of claim 14, wherein the client device is a mobile phone.

16. The system of claim 11, wherein synchronizing one clock to another clock comprises:
requesting a first clock value, $C_1$, from the another clock;
obtaining a first local clock value, $C_{2t1}$, local to the one clock at a time, $T_1$, of the request;
receiving the first clock value, $C_1$, from the another clock;
obtaining a second local clock value, $C_{2t2}$, at a time, $T_2$, of receipt of the first clock value, $C_1$;
determining a difference between the time, $T_1$, of the request and the time, $T_2$, of receipt of the first clock value, $C_1$;
determining a first average local clock value by averaging the first, local clock value, $C_{2t1}$, and the second, local clock value, $C_{2t2}$;
obtaining a second clock value, $C_1$, and a second average local clock value, $C_2$;
determining a first value, alpha, based on a ratio of:
a difference between the first clock value, $C_1$, and the second clock value, $C_1$, and
a difference between the first average, local clock value, $C_2$, and the second average, local clock value, $C_2$; and
determining a second value, beta, based on the first value, alpha, and one of:
the first clock value, $C_1$, and the first average, local clock value, $C_2$, and
the second clock value, $C_1$, and the second average, local clock value, $C_2$.

17. The system of claim 11, wherein the instructions, when executed by the one or more processors, cause the system to:
schedule an event across two or more of the first device, second device, third device, and fourth device.

18. The system of claim 11, wherein the instructions, when executed by the one or more processors, cause the system to:
determine, whether media is being recorded; and
responsive to determining that media is being recorded, smooth the synchronizations and the resynchronizations over a period of time to avoid a discontinuity.

19. The system of claim 11, wherein the first device, the second device, and the third device are associated with a first user, and a fifth device, a sixth device, and a seventh device are associated with a second user at a location remote from the first user, and wherein the instructions, when executed by the one or more processors, cause the system to:
synchronize a fifth clock to a sixth clock, the fifth clock associated with the fifth device, the fifth device associated with the first device type, the sixth clock associated with a sixth device, the sixth device associated with the second device type;

subsequent to synchronizing the fifth clock to the sixth clock, synchronize a seventh clock to the fifth clock, wherein the seventh clock is associated with a seventh device, the seventh device associated with the first device type;

synchronize the sixth clock to the fourth clock, the fourth clock associated with the fourth device, the fourth device associated with the third device type;

subsequent to synchronizing the sixth clock to the fourth clock, resynchronize the fifth clock to the sixth clock; and subsequent to resynchronizing the fifth clock to the sixth clock, resynchronize the seventh clock to the fifth clock.

20. The system of claim 19, wherein the first user and the second user remotely collaborate on a recording, the first device, the second device, the third device, the fifth device, the sixth device, and the seventh device synchronized to the fourth device.

* * * * *